Jan. 10, 1933.  W. J. DE REAMER  1,894,089
MOLDING MACHINE FOR PULP
Filed Nov. 16, 1931   17 Sheets-Sheet 1

INVENTOR
William J. De Reamer
BY
Staley & Welch
ATTORNEYS

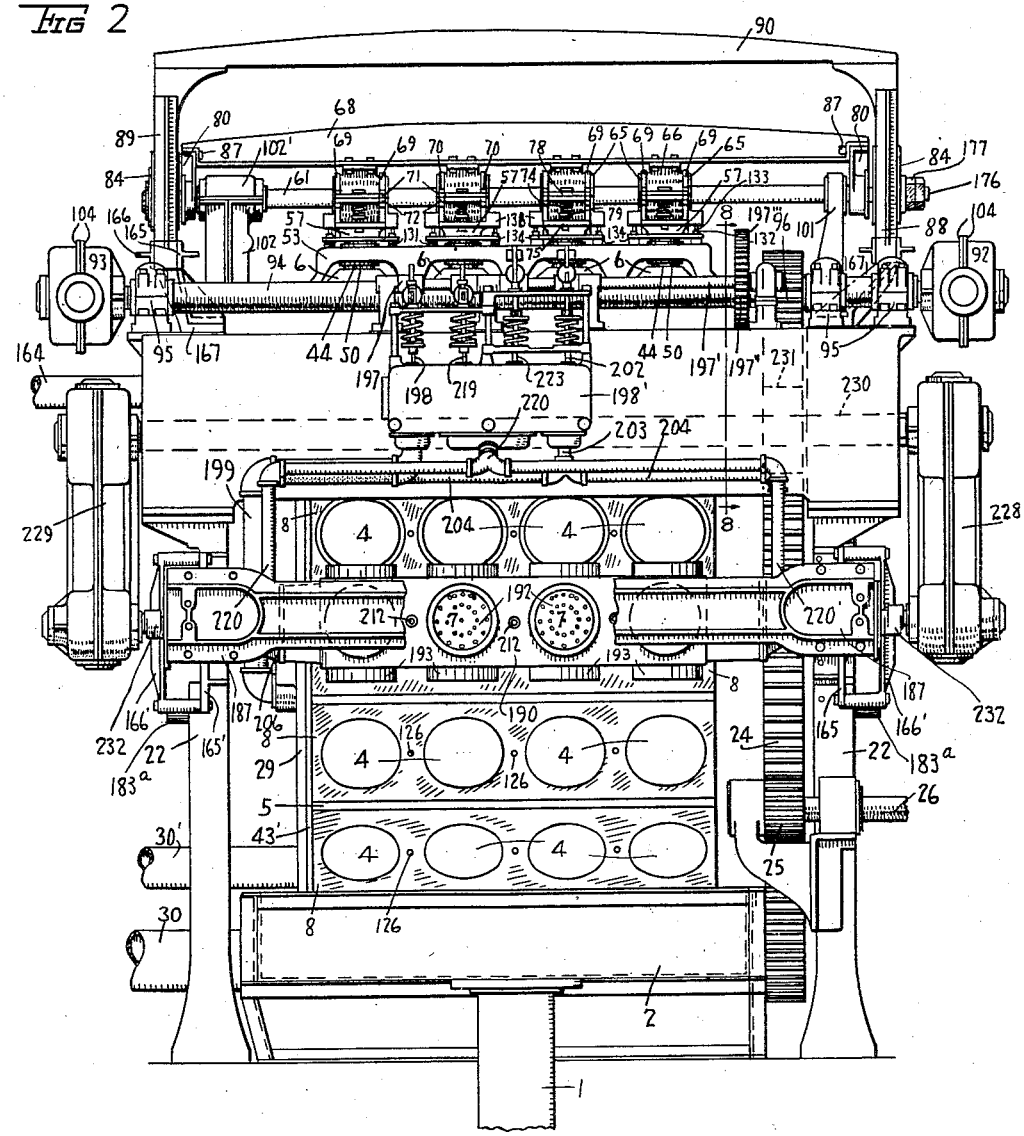

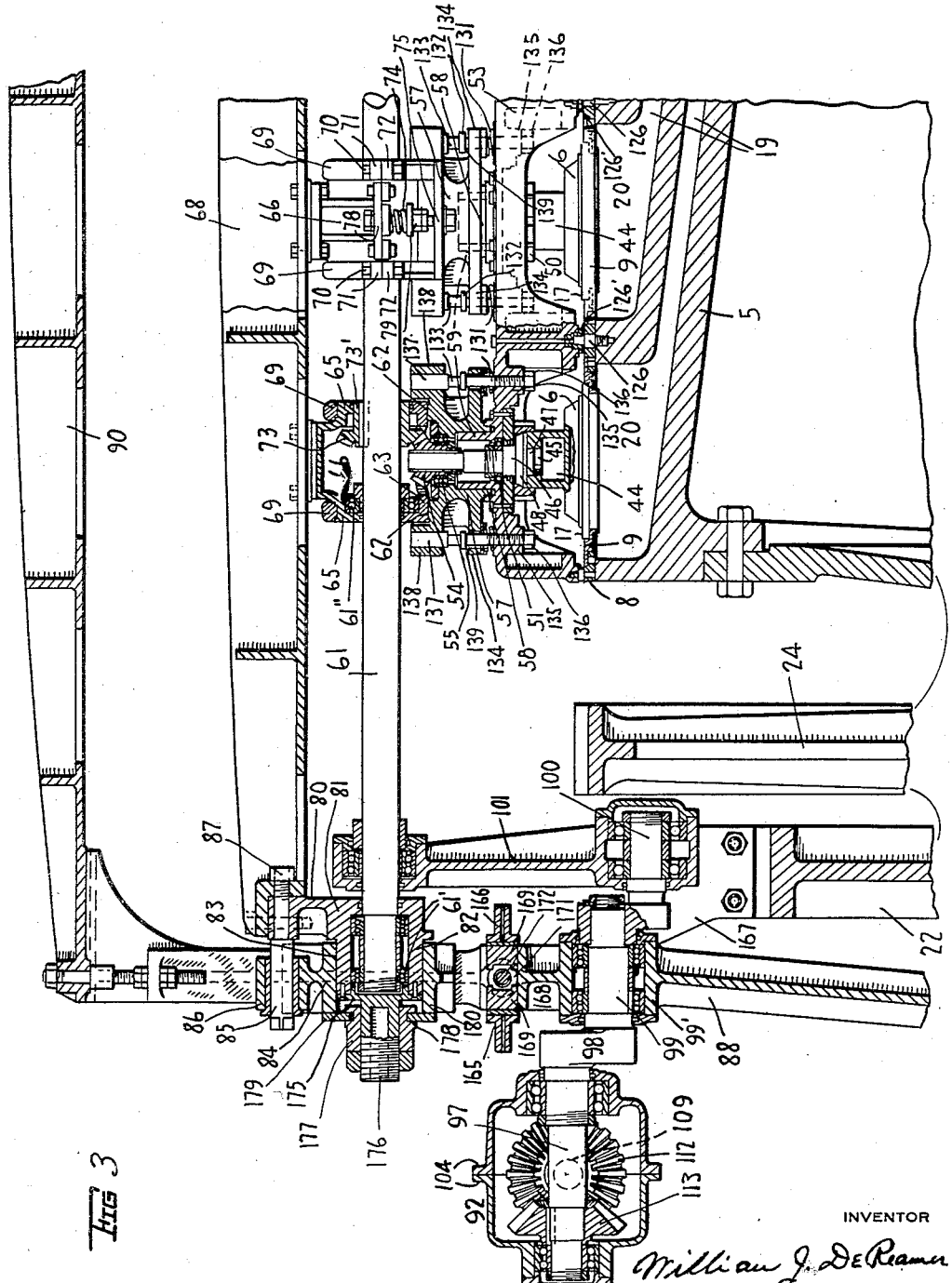

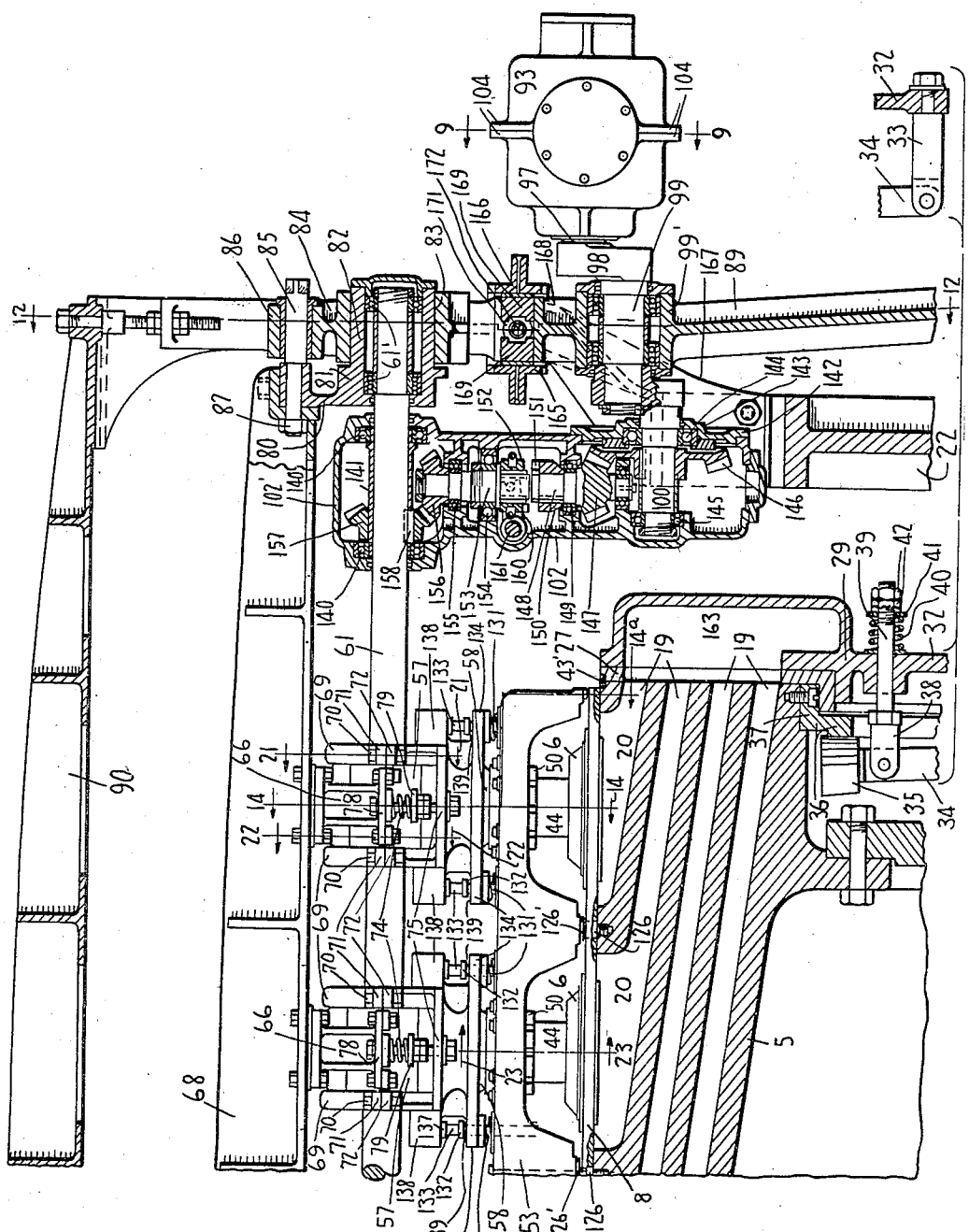

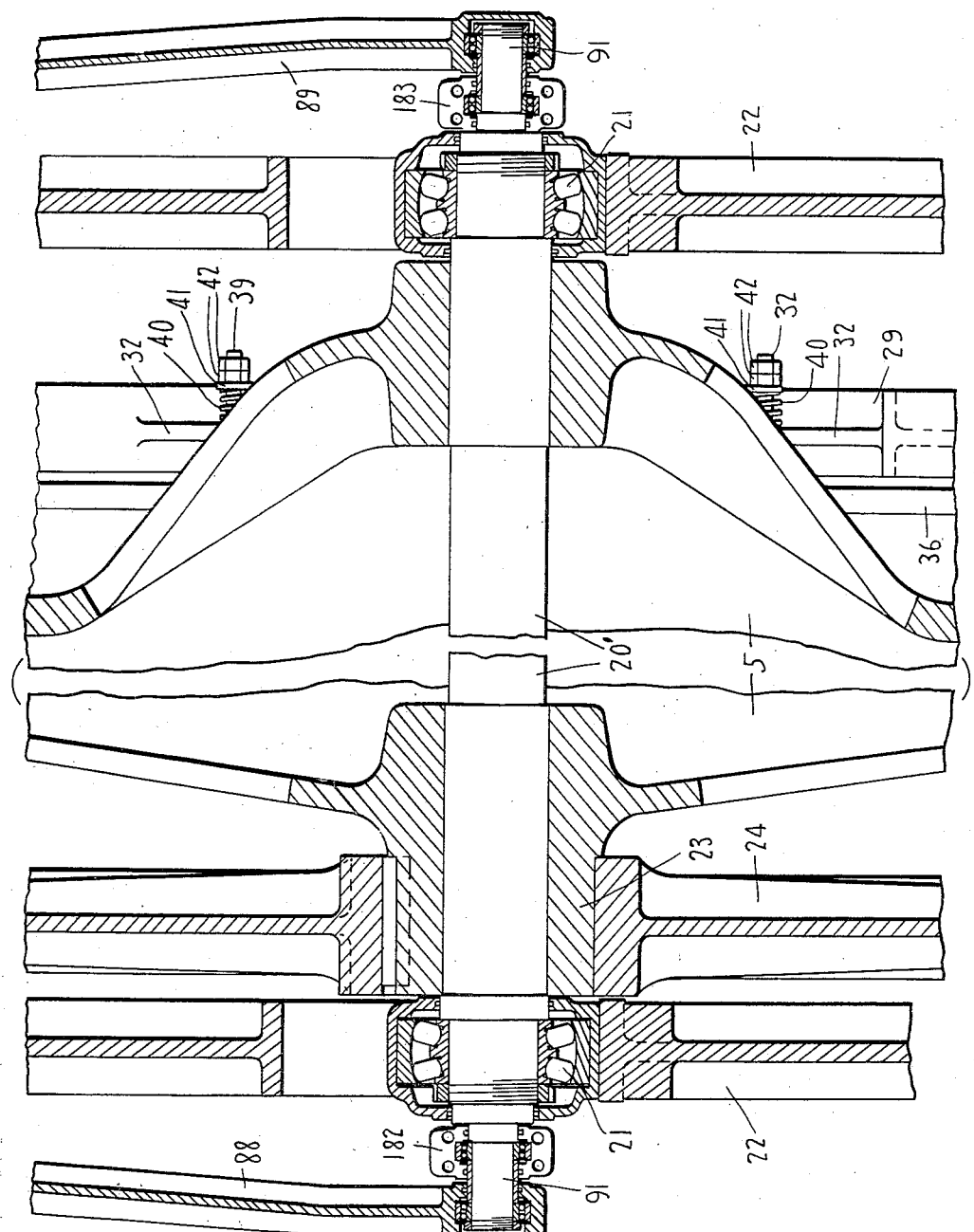

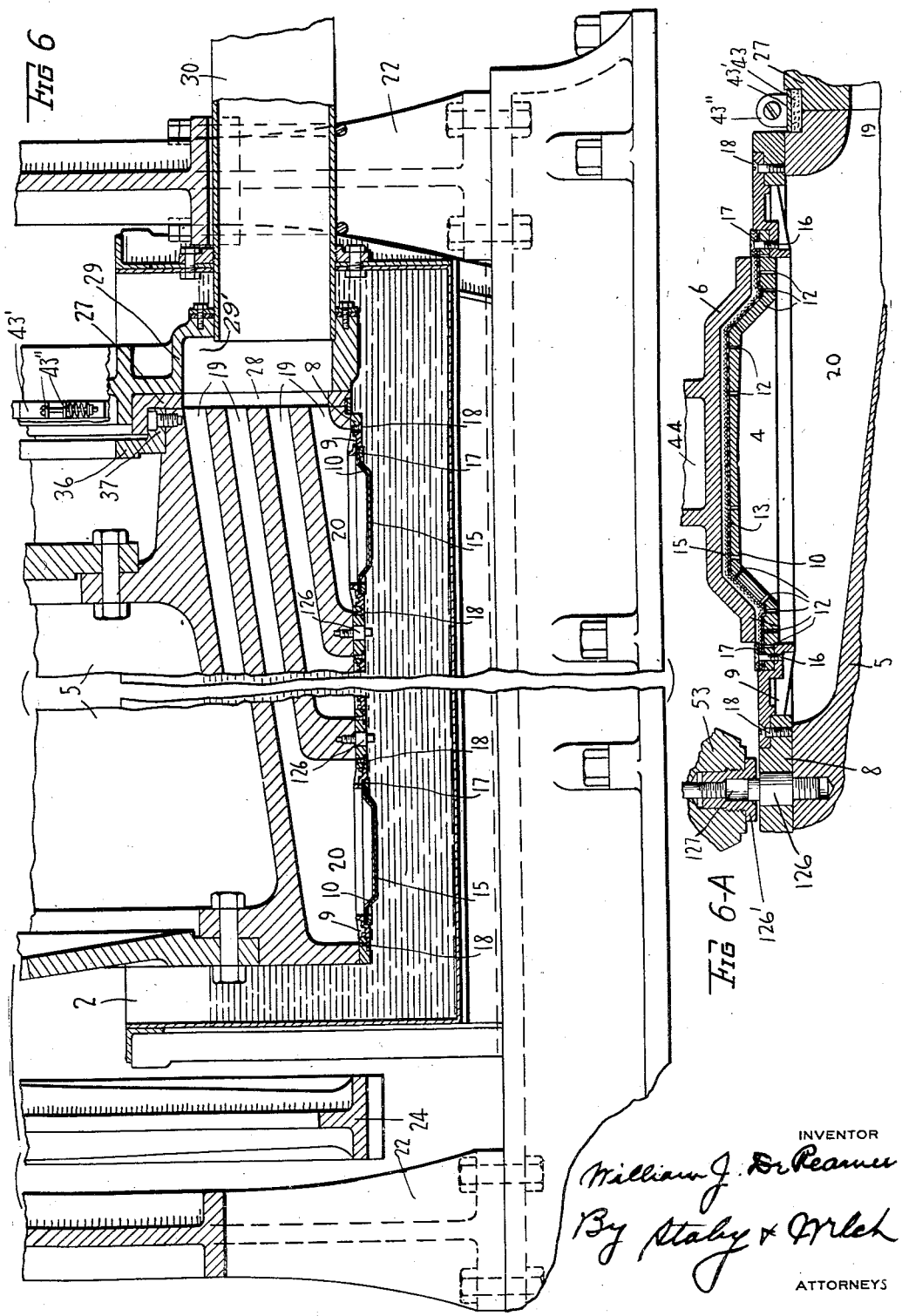

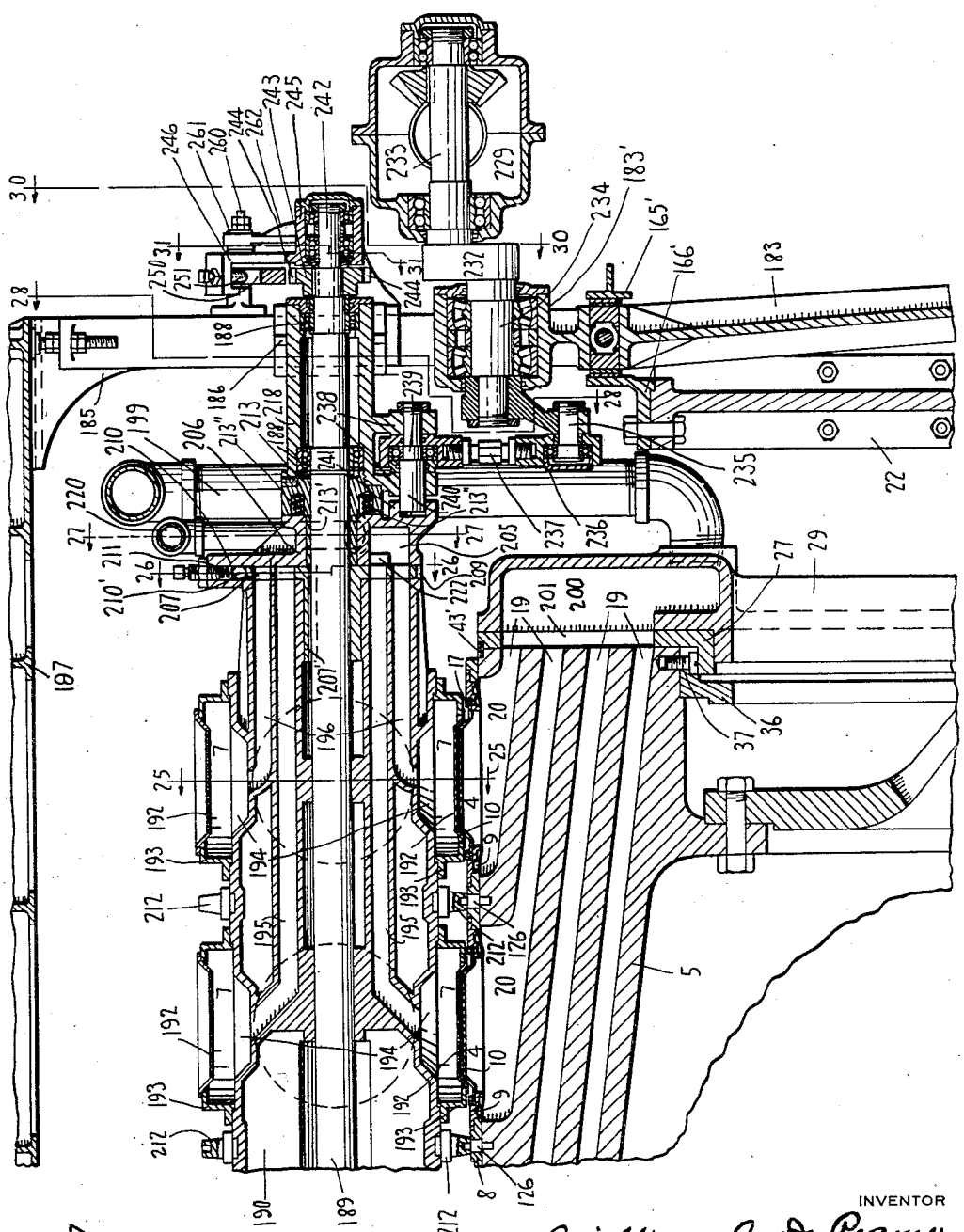

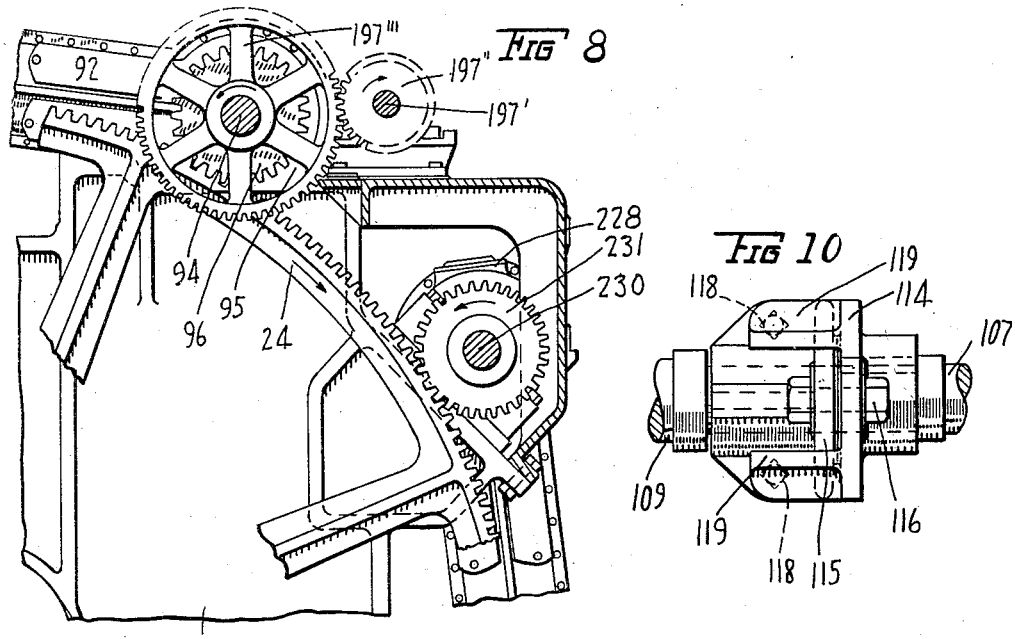

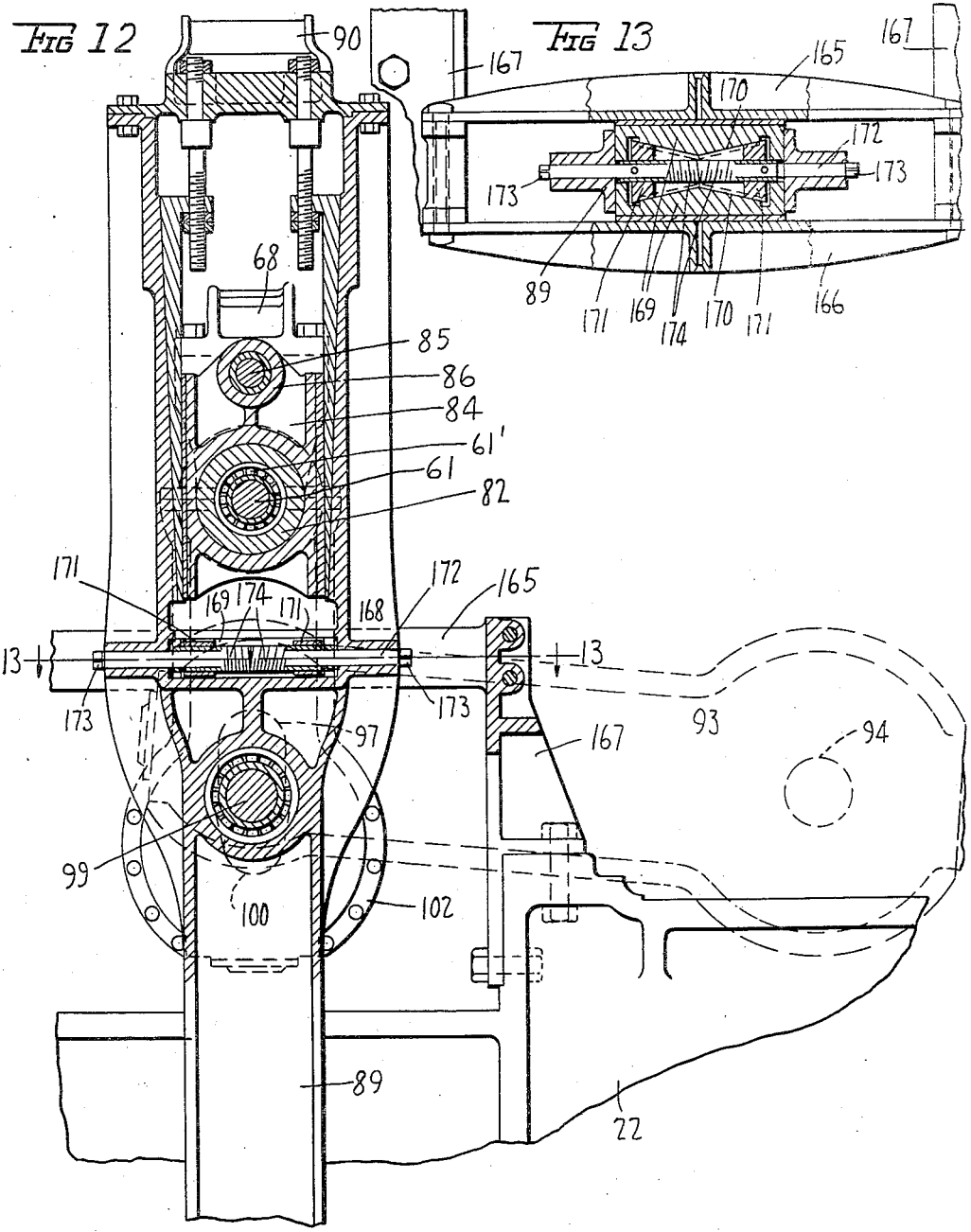

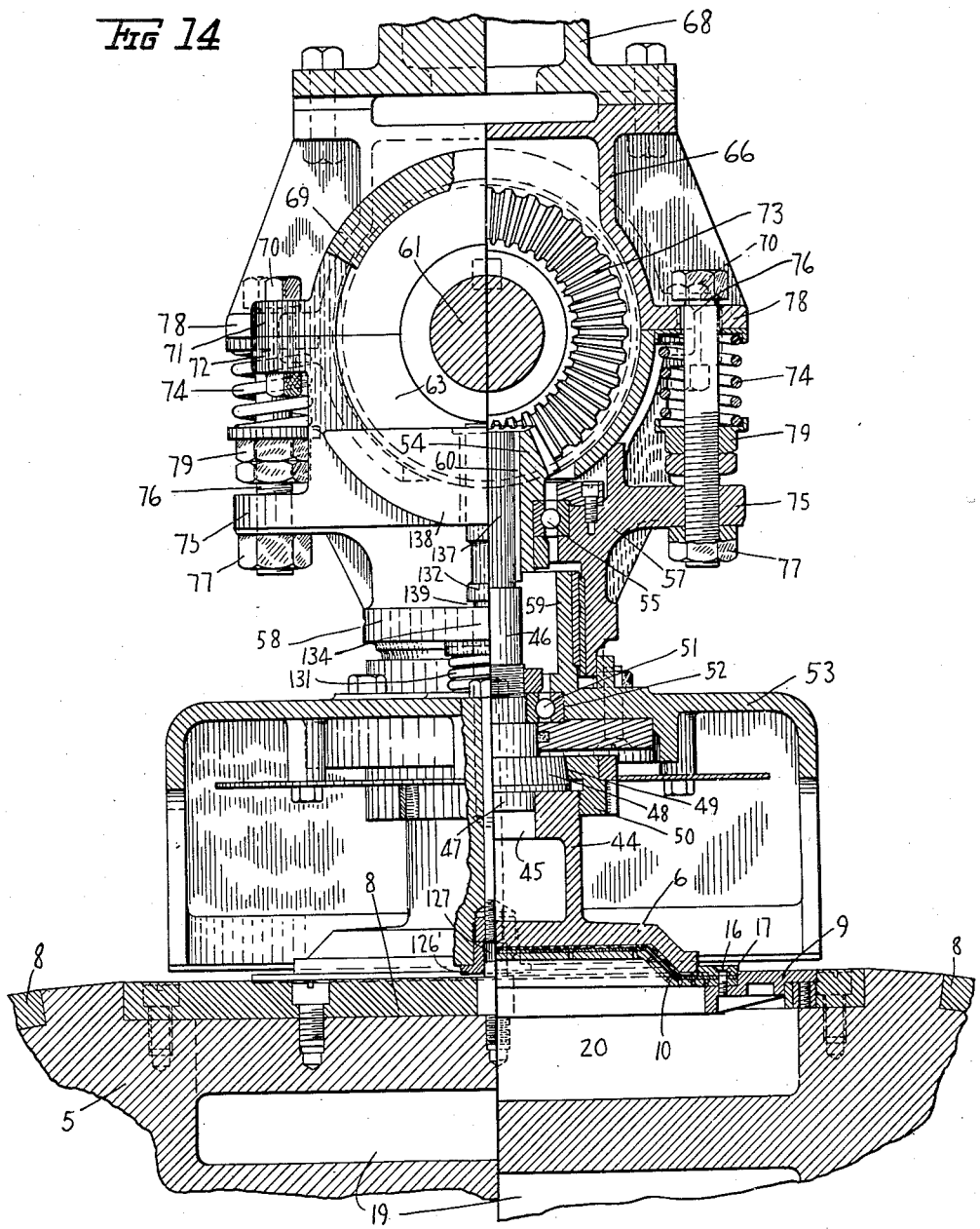

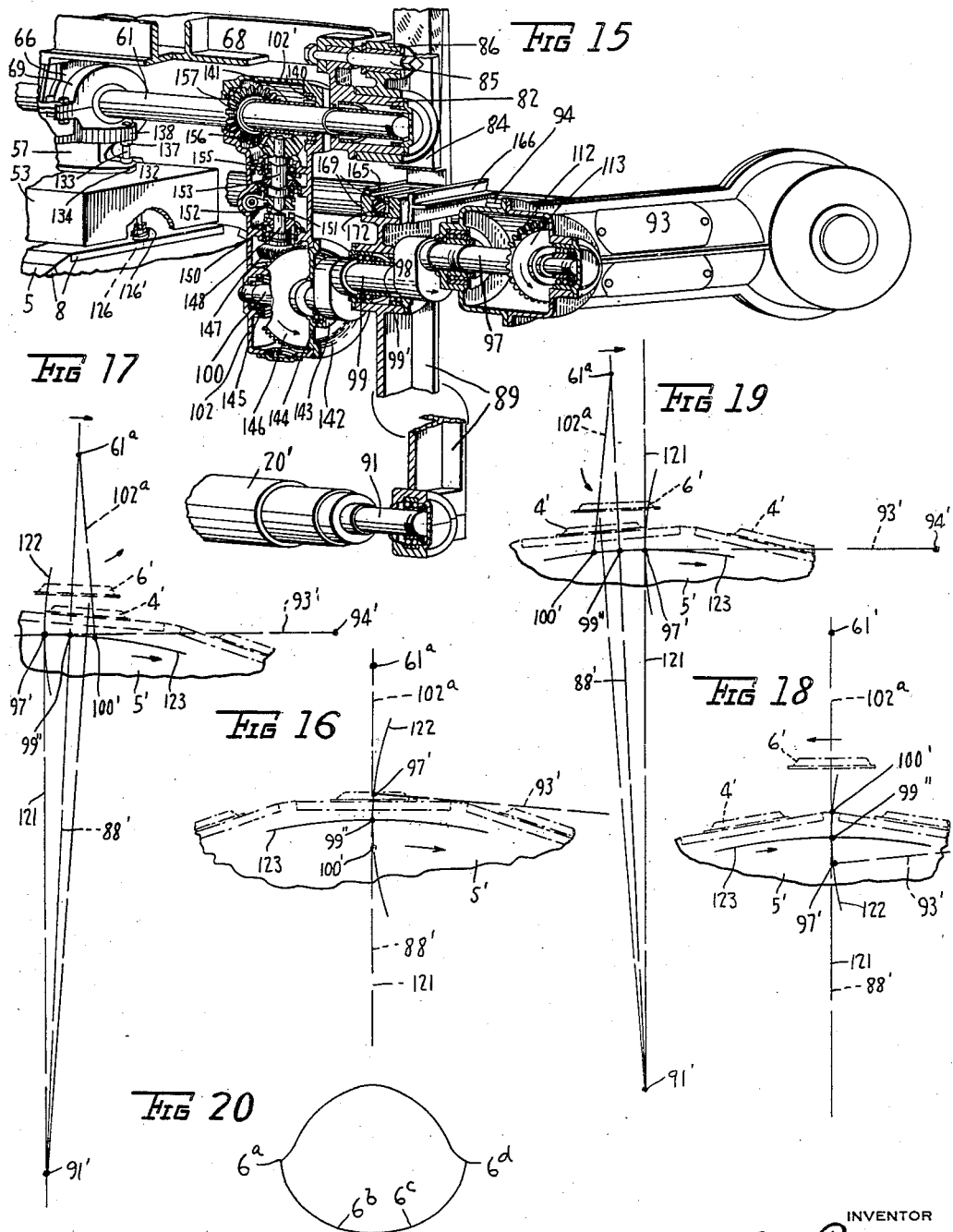

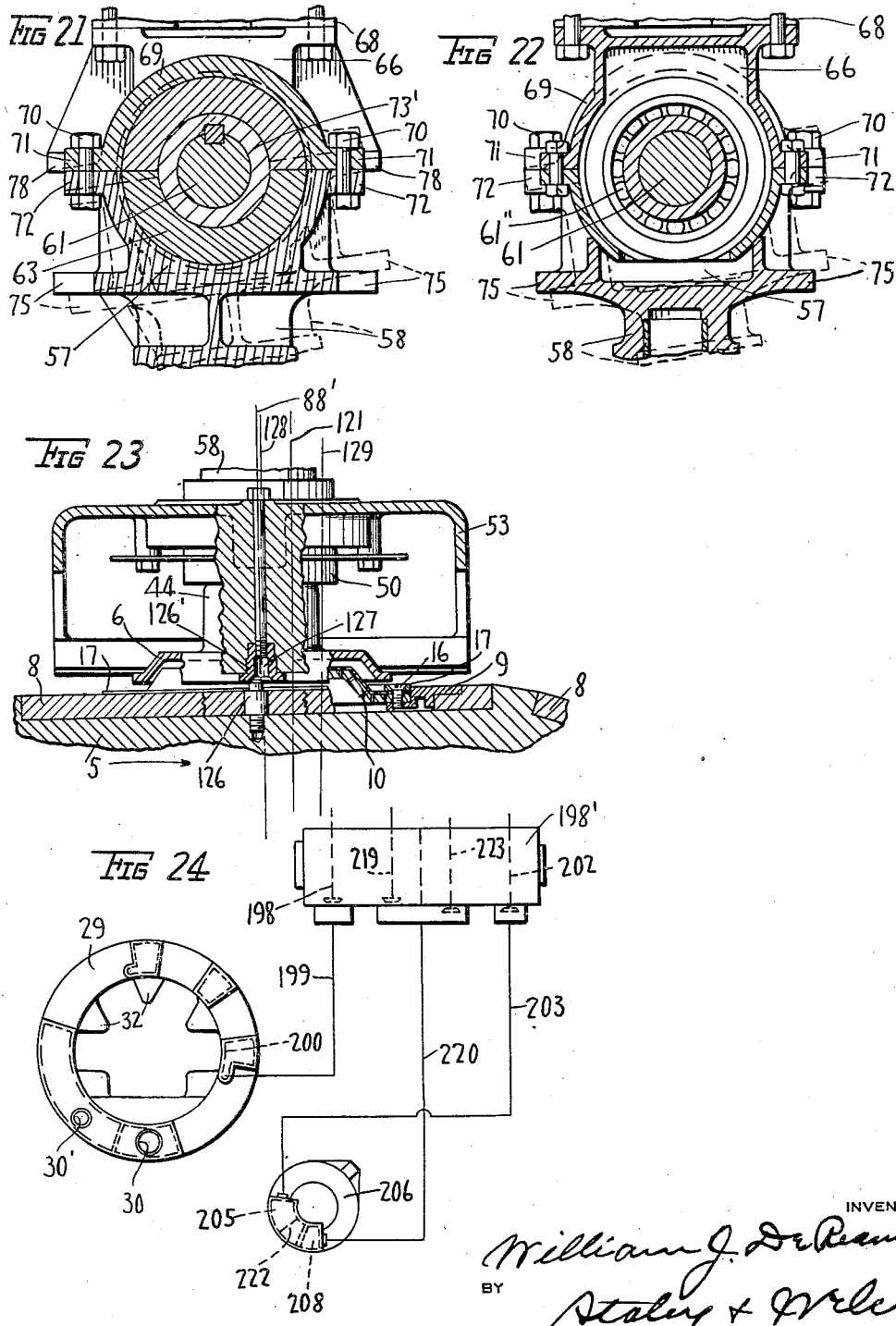

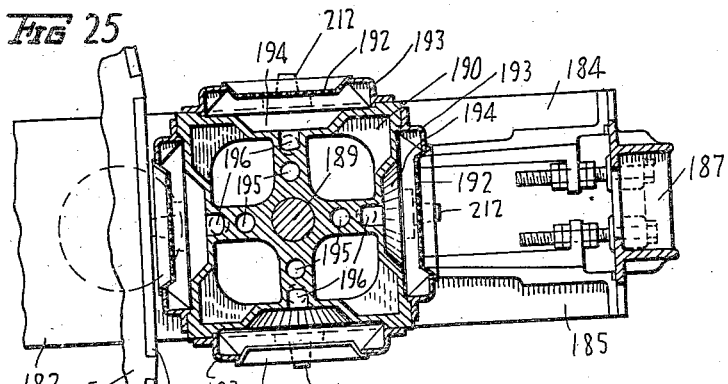

Jan. 10, 1933.  W. J. DE REAMER  1,894,089
MOLDING MACHINE FOR PULP
Filed Nov. 16, 1931  17 Sheets-Sheet 14
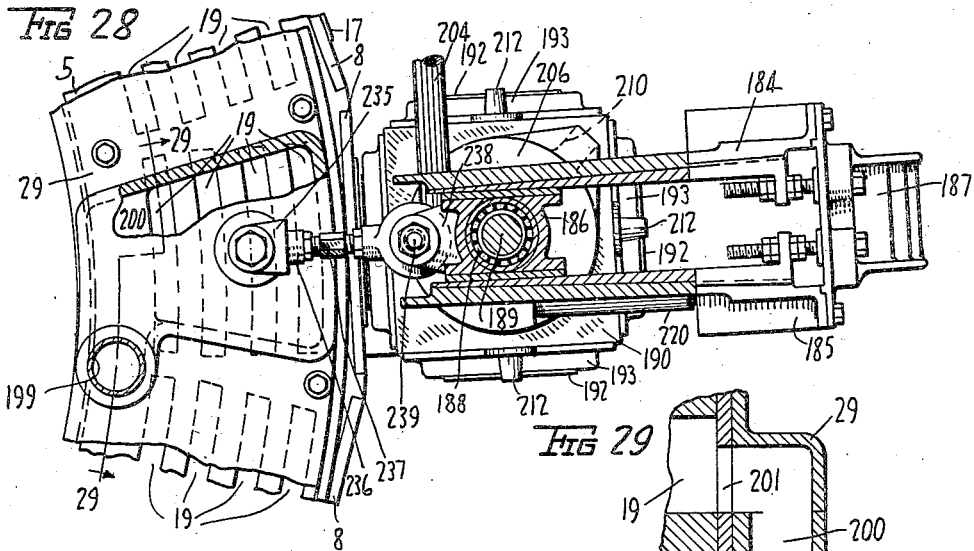
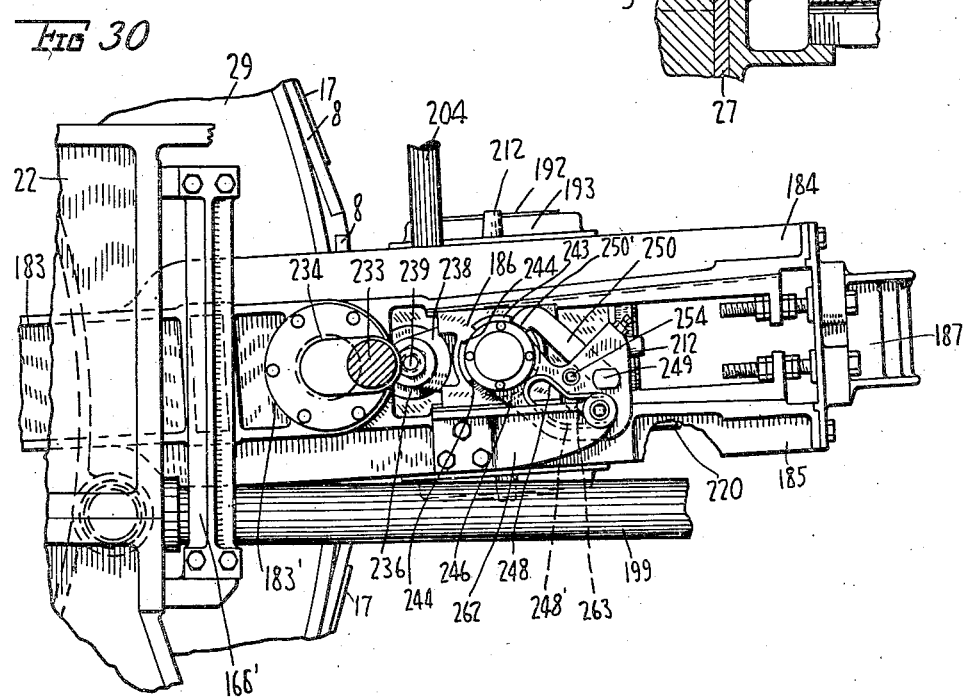
INVENTOR
William J. De Reamer
BY Staley & Welch
ATTORNEYS Jan. 10, 1933. W. J. DE REAMER 1,894,089
MOLDING MACHINE FOR PULP
Filed Nov. 16, 1931 17 Sheets-Sheet 15
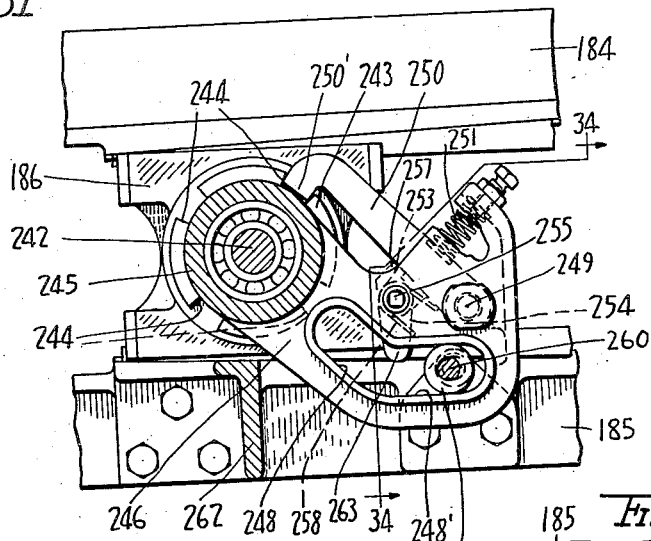
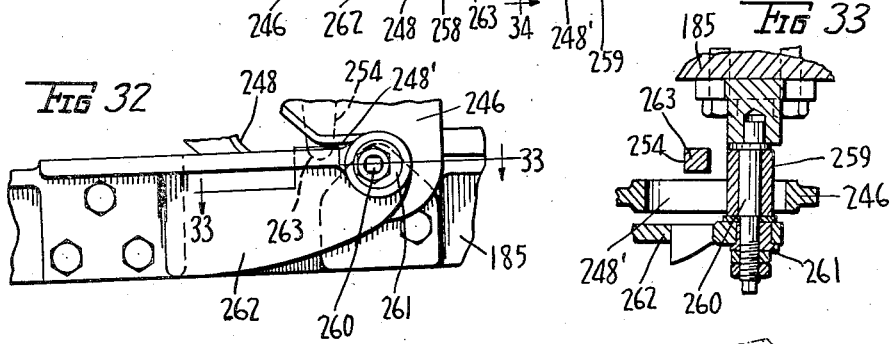
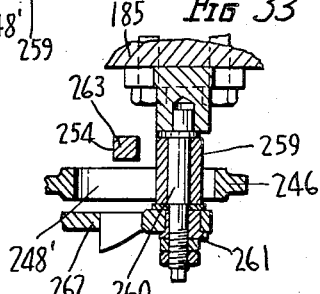
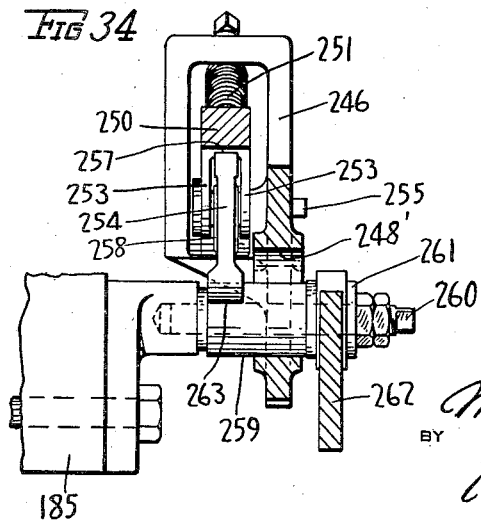
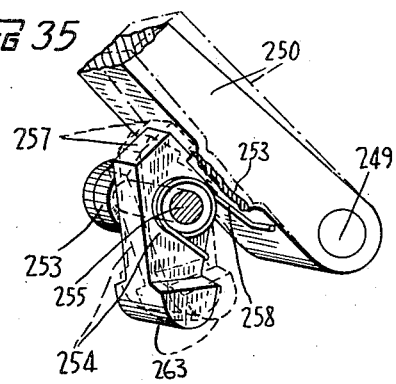
INVENTOR
William J. De Reamer
BY
Staley + Welch
ATTORNEYS Jan. 10, 1933.  W. J. DE REAMER  1,894,089
MOLDING MACHINE FOR PULP
Filed Nov. 16, 1931    17 Sheets-Sheet 16
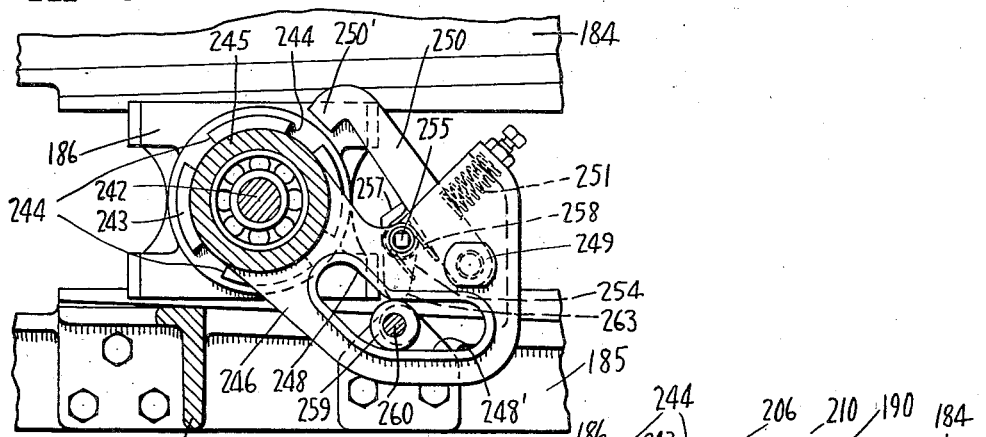
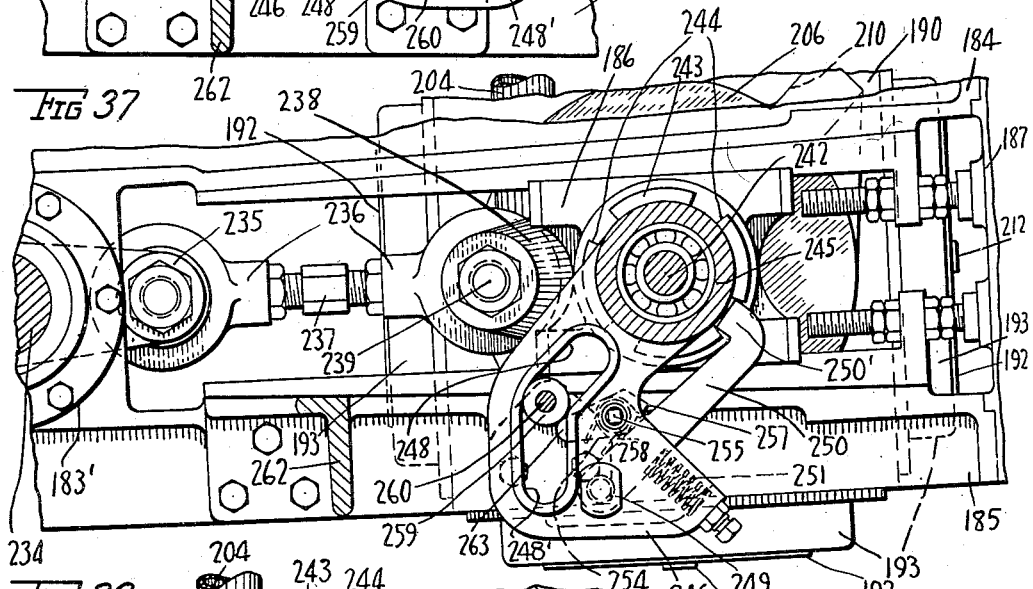
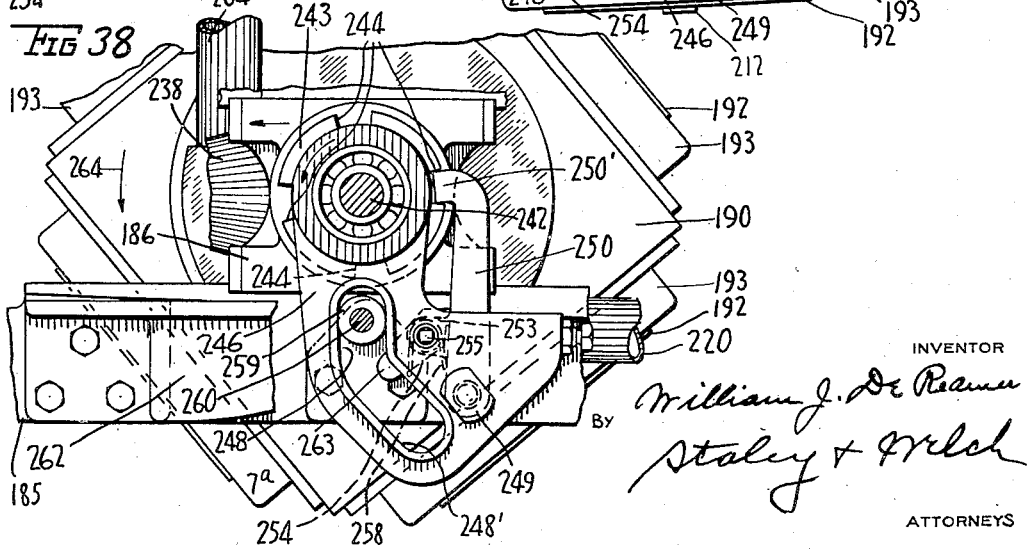

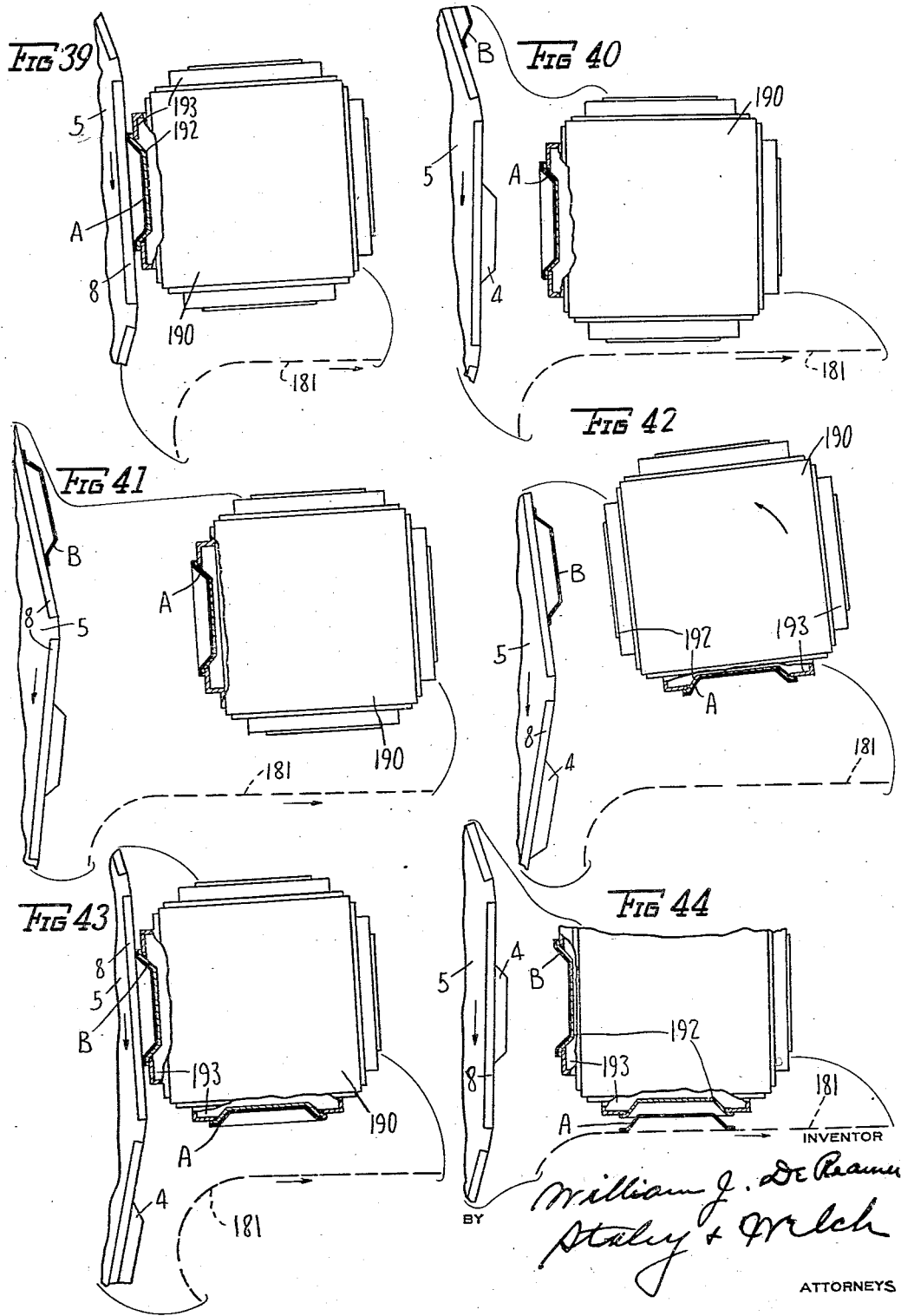

Patented Jan. 10, 1933

1,894,089

UNITED STATES PATENT OFFICE

WILLIAM J. DE REAMER, OF CROWN POINT, INDIANA, ASSIGNOR TO MAPES CONSOLIDATED MANUFACTURING COMPANY, OF GRIFFITH, INDIANA, A CORPORATION OF DELAWARE

MOLDING MACHINE FOR PULP

Application filed November 16, 1931. Serial No. 575,297.

This invention relates to improvements in machines for molding fibrous pulp articles, it more particularly relating to that type of machine which has a molding drum movable through a tank containing pulp in solution and upon which the pulp is deposited by air suction, in connection with a compression device for compressing the molded articles upon the drum and a transfer device for removing the articles from the drum.

In some machines of this type, it has been the practice to impart a continuous rotary movement to the molding drum and to have the compressing device and transfer device each in the form of a continuously rotating cylinder each provided with molding surfaces mating with the molded surfaces of the molding drum. In a machine of this type, the molding surface on the drum and the mating molding surfaces on the compressing device and transfer device are curved to conform to the respective peripheries of the molding drum and compressing and transferring devices which is a satisfactory arrangement for the molding of certain articles such as egg-case flats. For molding other articles, however, such as for instance pie-plates, dishes, trays and the like, it is necessary to have the molds of the molding drum of a shape conforming to the final shape of the molded article; that is, the molds cannot extend on the arc of a circle conforming to the periphery of the molding drum as that would distort the molded article, but on the contrary each mold must be so formed and positioned that the molds of the drum form a polygonal molding surface. The mating molding surface of the compressing device and the transfer device must be correspondingly formed. Obviously such a form of molding surface on a continuously rotating molding drum precludes the possibility of having the molding surfaces on the compressing device and the transfer device each arranged about a rotary cylinder which will register with the molding surfaces of the molding drum, as in the first type of machine referred to.

In some machines in which the molding surface of the molding drum is of polygonal form, an intermittent rotary movement is imparted to the molding drum, and that drum and the compressing device and the transfer device are relatively movable to and from each other upon each intermittent stoppage of the drum which naturally results in a loss of time and requires the employment of more or less complicated mechanism for imparting the intermittent movements to the molding drum.

The object of this invention is to provide in a molding machine which employs a molding drum having a polygonal molding surface, an arrangement of compressing device and transfer device which will permit the molding drum to be continuously rotated.

A further and more specific object of the invention is to provide a compressing device which will travel with the molding drum during a portion of its revolution for the purpose of compressing the molded articles, and also to provide a transfer device which will have a similar mode of operation.

Other objects of the invention will appear from the accompanying description and statement of advantages.

In the accompanying drawings:

Fig. 2 is an end elevation of the same machine.

Fig. 3 is an enlarged fragmentary vertical section, partly in elevation of a portion of the machine, the section being taken on the line 3—3 of Fig. 1.

Fig. 4 is an enlarged fragmentary vertical section partly in elevation of a portion of the machine, the section being taken on the line 4—4 of Fig. 1.

Fig. 5 is an enlarged fragmentary vertical section on the line 5—5 of Fig. 1.

Fig. 6 is an enlarged fragmentary vertical section on the line 6—6 of Fig. 1.

Figure 1:
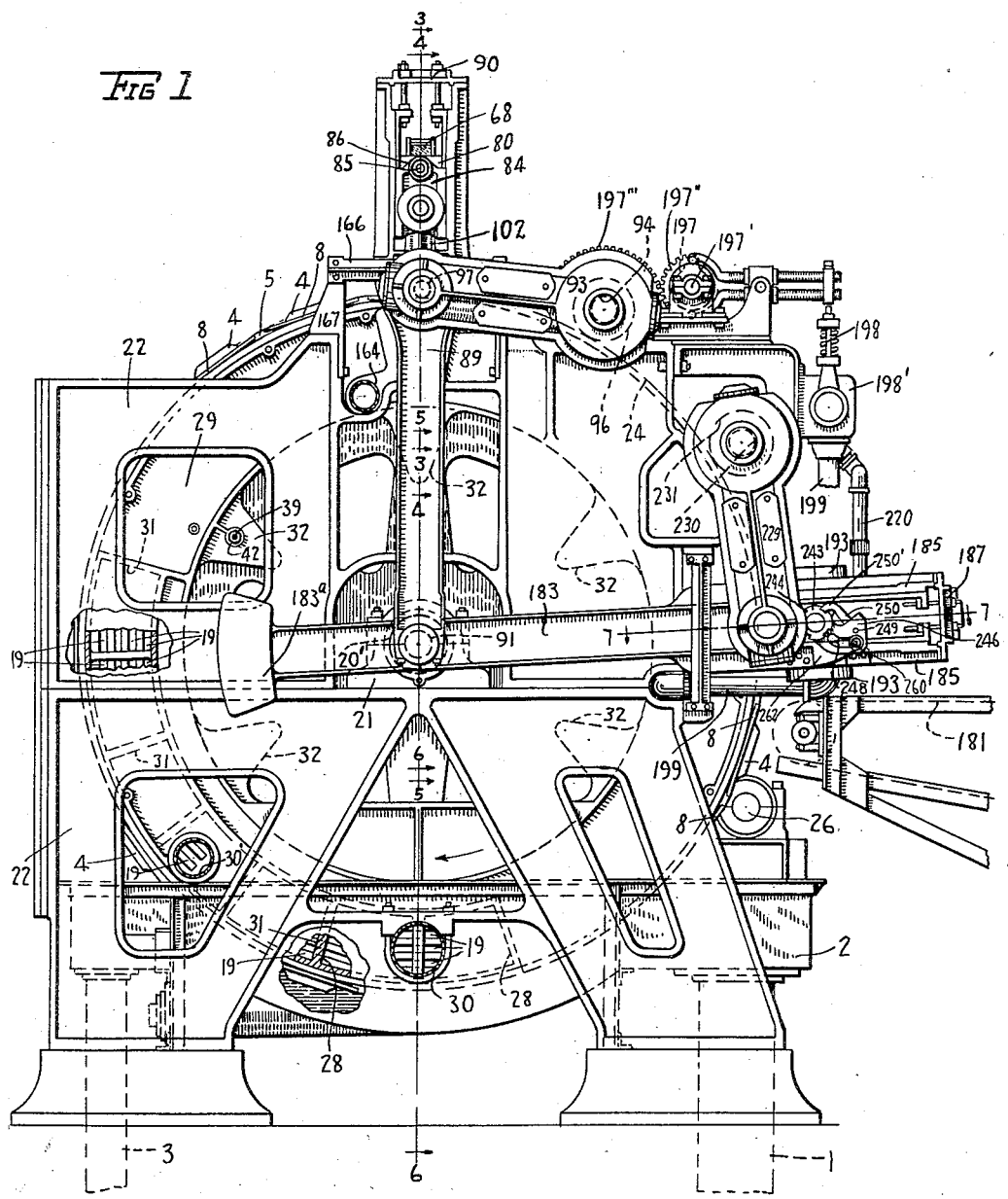
Fig. 1 is a side elevation of a molding machine in which the principles of the invention are embodied.

Fig. 6—A is a further enlarged fragmentary section showing in greater detail a portion of the mechanism shown in Fig. 6.

Fig. 7 is an enlarged fragmentary sectional view taken on an approximately horizontal plan indicated at 7—7 in Fig. 1.

Fig. 8 is a fragmentary transverse section on a slightly enlarged scale of a portion of the machine, the section being taken on the line 8—8 of Fig. 2.

Fig. 9 is a further enlarged vertical section on the line 9—9 of Fig. 4 showing one of the elements of the mechanism in detail.

Fig. 10 is a further enlarged elevation of the portion of the mechanism shown in Fig. 9 in section.

Fig. 11 is a transverse section on the line 11—11 of Fig. 9 and is on the same scale as that figure.

Fig. 12 is a fragmentary vertical section on the line 12—12 of Fig. 4.

Fig. 13 is a fragmentary horizontal section on the line 13—13 of Fig. 12. Figs. 12 and 13 are on the same scale as Fig. 9.

Fig. 14 is a further enlarged transverse section the major portion of which on the right of the center line is taken on a line 14—14 of Fig. 4. A portion of this view is in elevation and another portion is in section, the section being taken on the line 14—A of Fig. 4.

Fig. 15 is a view comprising an elevational perspective and sectional view of a portion of the driving mechanisms of the compression means, the portion being shown in section being on the same line as indicated at 4—4 of Fig. 1. The scale of this figure is the same as that in Fig. 8.

Figs. 16, 17, 18, 19 and 20 are diagrammatic illustrations of the motions of compression means.

Fig. 21 is a fragmentary enlarged transverse section on the line 21—21 of Fig. 4.

Fig. 22 is an enlarged fragmentary transverse section on the line 22—22 of Fig. 4.

Fig. 23 is an enlarged fragmentary transverse section on the line 23—23 of Fig. 4.

Fig. 24 is a diagrammatic illustration of air and vacuum devices associated with the transfer mechanism.

Fig. 25 is a fragmentary enlarged transverse section on the line 25—25 of Fig. 7.

Fig. 26 is an enlarged fragmentary transverse section on the line 26—26 of Fig. 7.

Fig. 27 is an enlarged fragmentary transverse section on the line 27—27 of Fig. 7.

Fig. 28 is an enlarged fragmentary section on the line 28—28 of Fig. 7.

Fig. 29 is a further enlarged fragmentary substantially vertical section on the line 29—29 of Fig. 28.

Fig. 30 is an enlarged fragmentary section on the line 30—30 of Fig. 7 showing in elevation portions of the transfer device and is on the same scale as Fig. 28.

Fig. 31 is an enlarged fragmentary transverse section on the line 31—31 of Fig. 7.

Fig. 32 is a fragmentary elevation of portions of the mechanisms shown in Fig. 31.

Fig. 33 is an enlarged fragmentary horizontal section on the line 33—33 of Fig. 32.

Fig. 34 is an enlarged fragmentary vertical section on the line 34—34 of Fig. 31.

Fig. 35 is a fragmentary enlarged view in perspective showing in greater detail some of the parts employed in the transfer mechanism.

Fig. 36 is a fragmentary enlarged vertical section on the line 31—31 of Fig. 7 showing some of the parts as seen in that section in a different working position.

Figs. 37 and 38 are also enlarged fragmentary sections on the line 31—31 of Fig. 7, each of which shows the parts in a still different working position.

Figs. 39 to 44 inclusive are diagrammatic views showing different positions assumed by the transfer drum.

Referring to the drawings, the pulp mixture is fed through a pipe 1 by a suitable pumping apparatus (not shown) to a tank 2 in which are employed suitable devices (not shown) to provide maintenance of the desired liquid level therein, the excess stock being conducted from the tank through pipe 3 and discharged at a suitable point (not shown).

The molds of which mention should be made at this time to distinguish one from another are those shown at 4 which being attached to the molding drum 5 will be termed drum molds, and the molds 6 which will be known as the compression molds, while the molds 7 will be known as the transfer molds.

Although the suction process is not new and although the present invention is not directed to improvements in the particular construction of drum molds, a short description will be given of them in order to more clearly show the coaction with the compression and transfer mechanisms.

Molds

Referring to Fig. 6—A, 8 represents an adapter plate, a plurality of which are secured in axially disposed recesses in the periphery of the drum 5. In the present instance, the adapter is provided with a plurality of circular openings into each of which is fitted a sub-frame 9. Concentrically located in the sub-frame 9 is the drum mold proper consisting of a grid 10 and numerous apertures 12. Over this grid is placed a formed, perforated metallic plate 13, and over this is placed a member 15 formed of comparatively fine mesh metallic wire cloth. Both the wire cloth member 15 and the perforated member 13 are so formed that one side of the article is produced in a finished state thereby. Screws 16 secure the members 10, 13 and 15 to the sub-frame in the order named, these screws also passing through a flat, comparatively thin ring 17, the inner bore of which forms the outer rim of the article in the molding operation. The sub-frame is secured to the adapter plate 8 by screws 18, making it possible to substitute a variety of molds for the purpose of varying the product of the machine.

Molding drum

Referring to Fig. 6, the drum 5 will be seen to have a plurality of series of ports 19 which communicate with cavities 20 below the under side of each drum mold. All of these ports are separated from one another, not only those of a series leading to the various molds which may be attached to any adapter plate, but also from other series of ports leading to other cavities.

The drum 5 is mounted on a shaft 20' (Fig. 5) carried in suitable bearings 21 fitted in the right and left hand frame members 22. On an extended hub 23 of the drum is fitted a gear 24 into which meshes a pinion 25, Fig. 2, on one end of a shaft 26 which is connected to a source of power (not shown), the direction of rotation of the drum being indicated by the arrow in the lower part of Fig. 1 One side of the drum. i. e., that side toward which the ports 19 extend, is finished smoothly, against which is fitted a stationary flat-ring-like plate 27. The plate 27 is provided with a plurality of apertures, 28 indicating those in the lower portion thereof; others will be mentioned in the course of the description. together with an explanation of the manner in which the functions of suction and admission of compressed air through these apertures are carried out. The plate 27 is secured to a stationarily supported ring-like member 29 having a plurality of cavities such as are indicated at 29' and elsewhere throughout the description. These cavities are provided with openings into which threaded pipes are inserted, which pipes are suitable connected with either the vacuum, or compressed-air mains (not shown). One such pipe 30 is thus in communication with the pocket 29' (see the lower portions of Figs. 1 and 6) and also thereby in communication with the openings 28 in the plate 27, the plate 27 being so positioned with respect to the member 29. The pipe 30 being connected to the vacuum lines, the cavity 29' is evacuated, and during rotation of the drum, each of the series of ports 19 is successively brought into registry with the apertures 28, and is immediately put into the communication with the vacuum pump whereby the air in the ports 19 and cavities 20 is greatly reduced in pressure and as the molds are at this time submerged in the pulp stock, atmospheric air pressure causes a felting of the fiber against the metallic wire cloth member 15.

On continued rotation, each of the series of ports 19 passes beyond the aperture 28 through which the initial aggregation of fiber on the mold surface was made and to other similar apertures 31 which also communicate by means of a pipe 30' with the vacuum apparatus, but at a lesser degree of vacuum. This is for the purpose of providing that the moist articles do not fall from the mold surfaces and also for the purpose of extracting any moisture possible during the passage of the series of ports by the apertures 31.

In order to provide against leakage of air into vacuum lines, the plate 27 is held in sliding relation with the finished surface of the drum by means shown in Fig. 4. Projecting inwardly from the vacuum box is a plurality of radially disposed arms 32 at the inner ends of which is fixed a stud 33 projecting toward the drum. In the free end of the stud 33 is pivotally mounted an arm 34 extending outwardly or towards the drum rim and on its free end is rotatably mounted a roller 35. This roller bears against a concentric flange 36 which is of angle section, the other leg of which 37 is secured to the inner edge of the drum rim as seen in Fig. 4.

In the arm 34 near the roller 35 is pivotally mounted a forked rod end 38 attached to a rod 39 provided on its outer end with a screw thread and passing through an aligned opening in the arm 32. On the outer extension of the rod 39 after its passage through the arm 32 is placed a coil spring 40 and a washer 41 and on the threaded end of the rod 39 nuts 42 are employed to provide any degree of compression on the springs desired. By this arrangement it will be seen that the power of the spring 40 is exerted toward causing a close fitting, slidably engagement of the plate 27 with the drum 5. As a further precaution against air leakage therein, the joint of the plate 27 and the drum 5 is covered by a felt packing ring 43 let into a reduced diameter recess partly in the drum 5 and partly in the plate 27 and held in place by a metallic ring 43' attached at various points by bolts and springs passing through ears 43" secured to the ring 43' as seen in Figs. 6 and 6—A.

Compression operation

The outer surface of the articles being produced up to this stage of the operation may not have a sufficiently attractive appearance and to provide the appearance desired with the further object and advantage that a major portion of the moisture be expelled and a uniformity in the wall thickness obtained, the compression and in some instances a polishing action is introduced.

The compression operation is initiated upon the product at a point just before, and is completed just after, it passes the vertical center line of the machine (Fig. 1). The mechanism which provides for the movement of the compression molds is shown at their mid-travel position in this figure. The compression molds 6 are complementary to the suction or drum molds, and if there was no material aggregated on the forming molds a metal-to-metal contact of drum and compression mold surface is obtained therefore in operation. Any material present on the drum mold is compacted in the compression operation. The compression molds are of two kinds, one capable of being rotated at the time of compression in order to provide a better finish, while another kind is non-rotatable, as previously mentioned, the latter being compression molds for rectangular or square dishes in the production of which it is obvious that non-rotating molds must be used. For the present the description will be confined to the mechanism in use when rotating compression molds are employed. All compression molds are preferably smoothly finished as regards their molding surfaces.

Referring to Figs. 3, 4 and 14 in particular, each compression mold 6 is provided with a hollow hubbed extension 44 having in the extremity thereof a bore 45 by means of which the mold 6 is maintained in axial alignment with a shaft 46, there being a boss 47 on the lower end of this shaft adaptable to insertion in the bore 45. The shaft 46 is further provided with an enlarged annular collar 48 having a tapering side 49 and previous to assembly a nut 50 having a tapered bore adapted to fit the collar 48 is positioned thereon. The lower end of the nut 50 is provided with internal threads for engagement with a threaded portion of the hub 44 whereby the compression mold is held securely to the shaft 46, and in alignment therewith.

The shaft 46 is rotatably supported near its lower end by an antifriction bearing 51, the inner race being pressed on the shaft while the outer race is retained in a bore 52 recessed in a beam 53, the beam 53 being preferably of sufficient length to provide means of support for such bearings as are indicated at 51 for each of the compression molds employed, it being noticed in the present drawings that the drum 5 carries a plurality of circumferential rows of equally spaced drum molds and that the beam 53 supports one compression mold for each circumferential row of drum molds; there being in the present case four circumferential rows of drum molds and consequently four compression molds.

The upper end of each shaft 46 is slidably fitted in a pinion 54 which is rotatably mounted by means of a anti-friction bearing 55 in the lower central portion of a housing 57. Each of the housings 57 has a downwardly extending hub portion 58 into which is slidably fitted an upwardly extending hollow boss 59 a plurality of which are concentrically located with reference to the shafts 46 on the upper surface of the beam and through each of which a shaft 46 extends.

The pinion 54 is splined to the shaft 46 by a spline 60 and the pinion is driven from the shaft 61 by a gear 73 whose hub 73' is keyed to the shaft 61 as shown in Fig. 14.

To allow for the proper registration of the molds of the drum and compressing device, provision is made for so supporting the compression molds that they may have a limited swinging movement and to that end the housing 57 is swivelly mounted with respect to the center of the shaft 1 which shaft extends from side to side of the machine in parallel arrangement with the main shaft 20 and supported in the manner to be explained. In order to swivelly support the housing there is provided a pair of straps 69 which are hung upon the semi-cylindrical bosses 65 projecting laterally from a bracket 66 which is secured to a beam 68. A semi-cylindrical bearing member 63 mates with the semi-cylindrical bosses and is fitted into semi-cylindrical bore 62 in the housing. These straps have projecting ears 71 which mate with ears 72 on the housing so that the straps and housing are each firmly secured together by bolts 70. By this arrangement it will be seen that the housing together with the entire assembly carried thereby including the molds may have a slight swinging movement upon the cylindrical bosses of the bracket.

In order to maintain the housing and the parts supported thereby normally in a vertical position, there are provided springs 74, one on each side of the structure. Each of these springs is interposed between an ear 78 on the bracket and a nut 79 threaded on a bolt 76, the bolt being in turn threaded in an ear 75 projecting from the housing and also being extended loosely through the ear 78 with its head coacting with that ear to form a stop to limit the swinging movement.

Means are provided for bringing the compression molds into operative relation with the molds on the molding drum, causing said compression molds to travel with the molding drum during the compressing operation, and for restoring the molding drums to initial position, which means will now be described:

Referring now to Figs. 3 and 4, which are in reality views which may be considered as one view each extending in opposite directions from the center line of the drum, it will be seen that the beam 68 extends over the top of the drum in parallel alignment with the drum shaft 20' and with the compression mold driving shaft 61. Each end of the beam 68 is attached to an upward extension 80 of right and left hand members 81, each of which has a cylindrical hub 82 rotatably mounted in the bores 83 of right and left hand cross-heads 84.

The purpose of the rotatable mounting of the hollow cylindrical hubs 82 in the cross-heads 84 is to provide a simple and effective means whereby the portion of the compression devices so supported may be placed in an accessible position for assembly, disassembly or inspection. The portion mentioned may be given a partial rotation after the removal of the studs 85, one each being inserted through a boss 86 integrally formed on the upper end of each cross-head 84, and through an aligned opening in each of the extensions 80, the studs being secured in place by the nuts 87 (Figs. 2 and 4).

The hollow hubs 82 also serve as supports for the extremities of the shaft 61 which is rotatably carried therein in bearings 61'. The shaft 61 is also rotatably carried at intermediate points there being bearings 62'' mounted in the internal bores of each of the left outstanding hubs 65 of the members 66 and in the corresponding end of the semicylindrical member 63.

The cross-heads 84 at either end of the beam are slidably mounted in the forked upper ends of a pair of arms, one each of which is employed at the right and left hand sides of the machine and which are indicated at 88 in Fig. 3 and 89 in Figs. 1 and 4. These arms are identical except as to the necessary right and left hand construction and each is pivotally mounted on the extensions 91 at either end of the main shaft 20', and are strengthened and tied together at their upper ends by a beam 90 extending over the top of the machine.

The arms 88 and 89 are thus the principal support of the major portion of the compression mechanism at points whereby the compression molds may be moved in a path that is at times substantially concentric with the drum 5. Since a single set of compression molds is employed, it is necessary to apply the set of compression molds successively to each succeeding axially aligned row of drum molds as the revolution of the drum advances the drum molds to the point at which the compression is to take place. In the present case, this point is at or near the vertical center line of the machine, for the purpose of providing that any fluid expressed from the articles is readily drained therefrom by the combined influence of gravity and suction.

The successive application of the single set of compression molds to the drum molds is accomplished by causing the compression molds to move in an approximately circular path such as is illustrated in Fig. 20, of which a more detailed description is to follow. The complete path is shown although it will appear that the lower portion only of the curve is of consequence, the remainder being merely incidental to the return of the compression mechanism to the starting point.

The compression molds in following this path are thus brought into registry with the drum molds, and due to the pivotal connection of the arms 88 and 89 at the molding drum center, move with a given point on the drum, through a short angular distance at approximately the same rate of speed during the compression operation, after which they are lifted from the drum molds and returned to a position to repeat the operation on the next succeeding series of drum molds. It should be clear that this movement of the compression is obtained without hindrance to the uniform rotary motion of the drum.

This movement is a result of the combined effect of reciprocations imparted to the compression molds with reference to the arms 88 and 89 and therefore in a substantially vertical plane, and of oscillations of the entire mechanism with respect to the vertical center line, in a substantially horizontal plane. The reciprocations of the compression molds vertically apply and lift these molds to and from the drum molds, while the oscillations of the arms on either side of the center line of the machine cause the desired alternate travel with the drum and the return of the molds to the starting position. The timing is so arranged that the end of the downward position of a reciprocation occurs when the compression mechanism arrives at the vertical center line at which time the force of compression is at its maximum degree.

The essential portion of the path of travel of the molds may be produced in a variety of ways, one such being cam-operated means, but I prefer to use the mechanism herein described and illustrated which provides the requisite movement without the use of cams and thereby insures that the operation of the machine is accompanied by a minimum of troublesome vibrations. This is accomplished by the use of the arms 88 and 89 previously mentioned and also by the use of other arms indicated in general at 92 and 93, there being one on each side of the machine, and by the use of a pair of two-throw crank-shafts.

The movement is produced by the rotation of a pair of two-throw crank-shafts 98, one on each side of the machine whereby operation of the compression mechanism is obtained without straining of portions thereof. The central portion of the crank shaft is indicated at 99, while the oppositely positioned throws are seen at 97 and 100, Figs. 3, 4 and 15 the latter being substantially at 180° displacement.

To produce the previously mentioned reciprocations of the compression moulds, the central portion 99 of each of the crank-shafts is rotatably mounted in an enlarged boss 99' in one of the arms, 88 or 89, while on each throw 100 is rotatably mounted the lower end of a connecting rod, a pair of which are employed, one each being positioned on each side of the machine. These rods are indicated at 101, Fig. 3, and 102, Fig. 4, and are further distinguished by referring to them as the dead and live connecting rods, respectively, inasmuch as the live rod 102 has incorporated therein a portion of the train of gearing which will be described later, by means of which the previously mentioned rotation of the compression molds is obtained. Each of these rods is of the same center-to-center distance and extend upwardly, and at their upper ends each is pivotally connected with the shaft 61 near the ends thereof. Rotation of the crank-shafts 98 in unison will therefore cause the alternate elevation and lowering of the compression molds, bringing about the reciprocations previously referred to as occurring in the substantially vertical plane.

To cause the oscillations of the compression mechanism by which the compression molds are caused to move alternately with the drum molds is the function of the crank-throw 97 of the crank-shafts 98. Each throw 97 is rotatably mounted in the free end of its respective hinged arm 92 and 93, the opposite ends of which are pivotally mounted on the ends of a horizontally disposed shaft 94, which also serves to provide rotative movement for the crank-shafts in a manner which will be described. The shaft 94 is supported on the upper portions of the frame 22 in bearings 95, Fig. 2, and derives its motion from the main gear 24 by the intermeshing of a pinion 96 keyed to the shaft 94.

It should be explained, however, that to produce the desired movement of the compression molds, it is essential that the hinged arms 92 and 93 be supported in an approximately horizontal plane, as seen best in Fig. 1, or, in other words, are at substantially right angles to the compression arms 88 and 89. Due to the interconnection of the crank-throw 97, the compression arms 88 and 89 will be at the mid-point of the oscillatory travel at the time when the hinged arms will be at one or the other extremity of their oscillations, and the oscillation of an arm 89 and 93 will be displaced in phase relation approximately ninety degrees.

Rotation of the crank-shafts 98 is brought about by interposition of the mechanism shown in Fig. 9, which is a view showing the interior construction of the arm 93. It will be understood that the same mechanism is reversed hand formation is also employed in the arm 92. The arm 93 is composed of two half-castings split on the longitudinal center line of the arm and bolted together by bolts passing through the flanges 104. This forms a hollow arm in the interior of which is located an arrangement of bevel gears. A gear 105 is secured to the shaft 94, and meshing with this is a bevel pinion 106 on one end of a shaft 107 mounted in anti-friction bearings 108 secured within the interior of the arm 93. A similar shaft 109 is rotatably mounted in bearings 110 and 111 in longitudinal alignment with the shaft 107 and on its outer end is fitted a bevel pinion 112 which meshes with a bevel gear 113 on the throw 97 (see Figs. 3 and 15).

The shafts 107 and 109 are in reality to be considered as one shaft although separated from one another but are joined by means of the connections shown in Fig. 10 in elevation and in 9 and 11 in section for the purpose of providing a finer timing arrangement than would be secured otherwise. This is secured by means of a disk 114 secured to the end of the shaft 107 which is bolted face to face with a similar disk 115 on the adjacent end of the shaft 109, bolts 116 being utilized for that purpose and passing through the disks at diametrically opposite points through circular openings in the disk 115 and through elongated openings 117 in the disk 114, thereby making it possible to shift one disk in a clock-wise or anti-clockwise movement relative one to another. In order to facilitate the shifting of one disk with relation to the other use may be made of a pair of set-screws 118 which are threaded through ears on the disk 115 and bear against outstanding jaws 119 integrally attached to the disk 113, whereby the changing of the setting is obtained by screwing one or the other of the set-screws 118 in or out, as the case may be, and finally clamping the disks together by the bolts 116. To avoid damaging the moist product collected on the drum molds 4, means are provided to guide the compression mold mechanism into registry with the drum molds.

This is accomplished by providing a plurality of dowels 126 (Figs. 3, 4, 6—A, and 14) which are fixed in and project outwardly from the periphery of the drum 5 and engage pilot bushing 126' inserted in the under side of the beam 53, a preferable position for the dowels being in the longitudinal center line of the adapter plate 8 between the drum molds. A two-fold advantage is secured by this arrangement in that due to the length thereof the engagement of the dowels 126 is made with the pilot bushing 126' prior to contact of a compression mold with any portion of the moist product on a drum mold, and also provides that compression may be initiated in comparatively accurate registry before the compression mechanism has arrived at the point at which the maximum compressive force is exerted, i. e., at the vertical center line of the machine. In this manner the duration of the compression is extended for the space of time during which the product is passing through a short angular distance adjacent the point of maximum compressive force.

Referring to Fig. 23, the dowel 126 is seen making contact with the chamfered edge of the bore 127 of the dowel bushing 126'. The line 128 shows the degree of angularity of the drum molds 4 from the vertical center line 121 or the maximum compressive force point, while the line 88' represents the center line of the compression arms 88 and 89. It will be seen from the slight angular difference between these lines that although they will both coincide with the line 121 on arrival at this line where the compression molds are theoretically in perfect registry only for an instant, that by guiding the compression molds into registry the actual compression can be started earlier as at the line 128 and will be prolonged as far as the approximate point or line 129 on the right of the center line. By further rotation (in the direction of the arrow) the dowel 126 causes the compression mechanism to swing to the left, and thus temporarily the compression molds will be shifted from the right-angle position noted earlier in the description of the functions of the springs 74.

This prolongation of the compression operation is permitted by the rotatable mounting of the compression members about the center line of the shaft 61 previously mentioned. Contact of the dowels 126 with the pilot bushings 126' continues until well after the time that the compression mold has actually left the surface of the product on the drum mold.

The pressure on the product is due to the action of a plurality of coil springs 131, one-half of one being seen in Fig. 14 and parts of others in section and elevation in Figs. 3 and 4. These springs act to force the beam 53 downwardly and since the compression molds 6 are directly connected with the beam the rise and fall of the beam causes a similar change in elevation of the compression molds. The downward movement of the beam 53 under the power of the springs 131 is limited by collars 132 on bolts 133 one each of which is utilized in a pair of oppositely positioned ears 134 integrally attached to each of the housings 57. The lower end of each of these bolts is threaded into a boss 135 in the beam 53 and secured there by a jam-nut 136. An upward extension 137 of the bolts 133, for the purpose of providing a supplemental guide arrangement, passes through openings in a pair of ears 138 also integrally attached to each of the housings 57.

In Fig. 14, the gap 139 between the collars 132 and ears 134 shows that the compression is obtained by spring pressure, the advantages of which are that serious damage to the parts may be averted in the event of the accidental engagement of any foreign element, and further, if a tendency develops in which the thickness of the articles is not uniform throughout an entire series, the beam 53 may assume an inclined position without undue strain.

During this movement the hollow boss 59 rises upwardly in the bore of the boss 58 and the upper end of the shaft 46 being slidably mounted in the pinion 54 also is permitted to rise upwardly. As soon as the rotation of the drum has proceeded sufficiently, the spring power gradually causes the beam to descend until the collars 132 make contact with the ears 134 after which the upward movement of the crank-throws 100 proceed to elevate the entire compression mechanism through the medium of the connecting rods 101 and 102, and as soon as the dowels 126 become disengaged from the pilot bushings 126', the springs 74 cause the beam and associated parts to restore themselves to their normal position.

It was previously mentioned on certain articles such as those of circular contour that the opposite surface to that formed by the drum molds were preferably polished by rotating compression molds. This is accomplished by a train of gearing, part of which has already been described comprising the bevel gears 54 and 73 on the shaft 61 and the remainder being gearing contained within what is known as the live connecting rod 102 as best seen in Fig. 4.

The live connecting rod 102 is a tubular casting having a cap 102' in which are jointly supported the outer races anti-friction bearings 140, the inner races of which are mounted on a sleeve 141 placed upon the shaft 61. The lower end of the live connecting rod 102 is provided with a large opening at one side over which is secured a cover plate 142 and in which is a centrally positioned boss 143 carrying the outer race of a bearing 144, the inner race of which is fitted to the crank-throw 100. The extension of the throw 100 is carried in the bearing 145 located on the inner wall of the rod 102.

On the crank-throw 100 within the interior of the connecting rod 102 is a bevel gear 146 which meshes with a bevel pinion 147 integrally attached to a short shaft 148 extending upwardly and carried by a bearing 149. On this upward extension 148 is fitted a part 150 of a multiple jaw-clutch, one jaw of which is indicated at 151. Coacting with this is another element 152 of the jaw-clutch which is slidably mounted and splined therewith on the lower end of a short shaft 153. The short shaft 153 is supported in ball bearings 154 and 155 and on its upper end is secured a bevel gear 156 meshing with the bevel gear 157 which is keyed to the shaft 61 by a key 158 projecting through an opening in the sleeve 141. The slidable element 152 of the jaw-clutch is brought into or out of clutching engagement with the element 150 by means of a forked lever 160 fixed to a shaft 161. It should then be seen that on rotation of the crank shaft 98 associated with the live connecting rod, motion will be transmitted through the train of gearing contained within the live connecting rod 102 and thereby cause rotation of the shaft 61, if the clutch members are in engagement; this motion will be transmitted to the compression molds through the gearing already described. It is obvious that the rotation of the compression molds is continuous throughout the entire cycle of compression.

When the product is such that rotating compression mold may not be used as in the case of the square or rectangular dishes previously mentioned, the jaw-clutch elements 150 and 152 are separated by actuating the shaft 161. In either case the compression operation not only serves to render more smooth the exterior surface of the moist product, but must thereby force a major percentage of the water therefrom, which is immediately withdrawn through the drum molds by combined action of gravity and the fact that the cavities 20 therebeneath are in communication, through the ports 19, with the pocket 163 in the vacuum box 29, which pocket is also in direct communication with a vacuum pump (not shown) through a pipe 164, Fig. 1.

The machine is shown as having four circumferential rows of twenty molds each on the molding drum and with a set of four compression molds in registry with but one series only of four molds. Therefore, the cycle of movement of the compression molds is completed twenty times during one revolution of the main drum. Accurate spacing of both drum molds and compression molds must be maintained at all times to provide for a product of uniform quality, and lateral motion of the compression mechanism should be reduced to a minimum. This is done by means of guides 165 and 166 placed one on each side of the compression arms and secured to the main frames 22 (see Figs. 12 and 13 for detail).

These guides 165 and 166 are supported by upstanding brackets 167 secured to the side frame member and form a way in which the arms oscillate. At the lower ends 168 of the forked portion of each of the arms 88 and 89 is placed a pair of guide shoes 169 having converging inner walls 170 against which bear wedge-blocks 171. These wedge-blocks are threaded, one having a right and the other a left hand thread whereby rotating a transversely mounted rod 172 having squared ends 173, on which are secured right and left-hand threaded sleeves 174 causes the wedge-blocks to force outwardly the guide shoes 169 into proper engagement with the guides 165 and 166.

As a further aid in providing an accurate adjustment the entire compression mechanism may be moved endwise, the endwise movement being considered as one in the direction of the longitudinal axis of the shaft 61. This is accomplished by means of a plate 175 (Fig. 3), secured to the outer end of the hub 82 and which has an integral cylindrical threaded extension 176 on which is threaded a nut 177 having a circumferential groove 178. Within the groove is placed a split flat plate 179 which in turn is secured to the outer side of the hub 180 of the cross-head 84, Fig. 3. Due to the connection of the threaded extension 176 to the member 81 as explained, rotation of the nut 178 in either direction will cause a corresponding endwise movement of the entire compression mechanism.

A brief description of the general operation of the devices as so far described is as follows:

The molding drum is rotated continuously in the direction of the arrow shown in Fig. 1. The arms 88 and 89 and their connecting beam 90 constitute an oscillatory member, while the beam 53 constitutes a support for the compression molds which is mounted for a reciprocating movement in the oscillatory member. Through the mechanism described including the crank-shaft 98, the oscillatory member is oscillated to thereby oscillate the compression molds through a limited distance about the axis of the molding drum and at the same time the crank-shafts reciprocate the supporting member with relation to the oscillatory member by the connecting rods 101 and 102.

In Figs. 16 to 20 inclusive, there are shown diagrams illustrating the paths of movement of the compression molds as they approach the molding drum, mate with the molds on the molding drum and finally leave the molding drum. The arrangement is such that as the compression molds approach the molding drum they will travel on a curve shown by the line 6$^a$ and 6$^b$ in Fig. 20. At 6$^b$ the dowel pins 126 on the drum will make contact with the chamfered edge of the dowel bushing 126′ and from that point to the point 6$^c$ the compression molds have mated with the molds of the drum and performed the compressing action. Between the point 6$^b$ and 6$^c$, the compression drums travel on a comparatively flat curve which enables them to maintain proper engagement of the molds with the molding drum, this flat curve being the result of the elliptical path 100$^a$ (Fig. 20) of the crank throws 100 and taking place while the throws 100 are traveling over the center of one of the long sides of the ellipse.

From the point 6$^c$ to 6$^d$ the compression molds rapidly recede from the molding drum and follow the curved lines between the points 6$^d$ to 6$^a$ from which latter point the operation is repeated.

Figs. 16, 17, 18, 19 and 20 are diagrammatic views showing the paths of travel of parts of the compression mechanism. In all these figures the main drum is shown in outline by an arc of a circle in dot-dash line indicated at 5′; in like manner a drum mold and compression mold are shown at 4′ and 6′ respectively. In Fig. 16 the drum mold 4′ and compression mold 6′ are in registry; this view therefore corresponds to other views such as Figs. 3, 14 or 15. The line 88' representing the center line of the arms 88 and 89 is coincidental with the vertical center line 121 of the machine, while the arcs 122 and 123 represent the arcs of oscillation of the arms 88 and 89, and 82 and 93 respectively.

Fig. 17 shows the change in the position of the parts due to a one-quarter revolution of the crank-shaft 97 in the direction of the arrow thereon in Fig. 15, while Figs. 18 and 19 show the positions after one-half and three-quarters revolution respectively. Other references seen in Figs. 16 to 20 inclusive indicate lines representing mechanical parts mentioned in the description having similar reference characters less the distinguishing exponential characters. Thus 61$^a$ represents the shaft 61; 102$^a$ represents the connecting rods 101 or 102; 88' represents the center line of the arms 88 or 89 and so forth.

Transfer mechanism

The moist compressed articles are removed from the forming mold and deposited upon the conveyor belt of a drying oven by transfer mechanism now to be described. Since the conveyor belt which is shown at 181 in Fig. 1, travels in a horizontal plane, it is obvious that a convenient point in the rotation of the forming molds at which to effect the transfer is when the forming molds are in a substantially vertical plane as at that point the transfer of the articles to the belt may be accomplished by a minimum amount of movement of the transfer mechanism.

Simultaneously with the arrival of the forming molds at the transfer point, the transfer mechanism causes the transfer molds to be brought into mating relation therewith and to also travel with the forming molds for a limited distance, this being accomplished by imparting to the support for the transfer molds both a reciprocatory and an oscillatory movement. Means are also provided for imparting a movement to the support for the transfer molds upon its own axis so as to move the transfer molds to a position above and in substantially horizontal alignment with the traveling belt. The transfer from the forming molds to the transfer molds is accomplished by an air pressure in the forming molds and an air suction in the transfer molds and the depositing of the articles from the transfer molds to the belt is by an air pressure timely applied to the transfer molds.

In the present machine, the transfer mechanism has a rotatable drum, the periphery of which is equipped with a plurality of equally spaced sets of transfer molds, there being four molds in each set in the persent case to correspond to the number of forming molds in each transverse set on the molding drum, and there also being in the present case four sets of transfer molds. The reason for providing a plurality of sets of transfer molds instead of a single set, as in the case of compression molds, is for the purpose of furnishing an arrangement which makes it possible to clean or inspect the transfer molds without stopping the mechanism, although it is to be understood that the invention contemplates the use of a single set of transfer molds with suitable provision for not only moving them to and from the molding drum and causing them to travel therewith, but also moving them to and from a suitable point of discharge onto the traveling belt, in which latter case the support for the transfer molds would be made to oscillate on its own axis instead of having imparted thereto a series of intermittent movements in the same direction.

The reciprocatory and oscillatory movements of the transfer mechanism are produced in substantially the same manner as the similar movements of the compression devices were obtained, while the partial rotation of portions of the mechanism is caused by devices which will be described later.

The transfer mechanism is illustrated in Figs. 1, 7, 24–38 inclusive. A pair of arms 182 and 183 correspond to the compression arms 88 and 89, and like them are pivotally connected to the extensions 91 of the main shaft 20', and are strengthened by the addition of a cross-member 187 which connect their free ends, forming an oscillatory frame. Each arm 182 and 183 is forked at its outer end, 184 and 185 indicating the forks. Within the jaws of each arm is fitted, for reciprocatory motion, a cross-head 186, these cross-heads being of right and left hand design and support the major portion of the transfer mechanism for reciprocatory movement within the oscillatory arms 182 and 183. Lateral movement is limited by adjustable shoes and guides in a manner exactly similar to that employed in the compression mechanism, 165' and 166' indicating the guides.

Fig. 7 is a section through the center of the transfer mechanism and shows but one-half thereof, the other half being a duplication in all particulars but in reversed hand formation and therefore not shown and any part of the description dealing with Fig. 7 may be assumed to be applicable to the opposite half of the mechanism. In the present case in addition to oscillatory and resiprocatory movements imparted to the support for the transfer molds, provision is made for imparting to the transfer mold support an intermittent rotary movement and is described as follows:

Supported by the cross-heads 186 is a shaft 189 arranged in parallel relation to the main shaft 20'. At the central portion of this shaft a transfer drum 190 is supported, partly directly on the shaft and indirectly at its its ends, there being inserted in a bore in the end of the drum the extended hub 207' of a disk 207, which in turn is keyed to the shaft 189, this construction being employed for manufacturing reasons only.

In the present instance, the transfer drum is square in cross-section and its length is approximately equal to the width of the molding drum face. On each side of the transfer drum is positioned a plurality of transfer molds 7 arranged in axial alignment and spaced apart the same center-to-center distance as the drum molds 4, equal in number to the number of axially aligned drum molds.

During the reciprocations of the transfer mechanism, on the inward stroke, the transfer molds are therefore caused to approach the drum molds, with which they eventually register, accurate registry being insured by the co-action of hollow dowel bosses 212 with the previously mentioned dowels 126 of the molding drum.

In the present case the transfer molds 7 consist of a perforated plate 192 so formed as to closely conform to the outer surface of the compressed articles on the molding drum and therefore encompass the entire exposed surface of the articles. These plates 192 are secured to suitable adapters 193 of which a variety may be employed, thereby accommodating any of the types of articles that may be produced in the machine.

Beneath each of the transfer molds are cavities 194 in the transfer drum and leading from each cavity adjacent the center of the drum is an individual port 195, while from each of the cavities 194 near the ends of the drums, leads a port 196 in parallel relation to the port 195. These ports extend each way from the center to the extremities of the drum and coincide with aligned apertures in the disk 207.

The manner of utilizing the ported transfer drum in connection with the vacuum and compressed air devices is as follows:

Arranged to closely fit against the outer surface of the disk 207 is a ported member 206 freely rotatably mounted on the extended hub 213' of a member 213 also rotatably mounted on the shaft 189. The ported member 206 is pressed against the disk 207 to provide and maintain a comparatively air-tight joint by springs 213'' seated in the member 213, which member is secured to the inwardly extending hub 218 of the cross-head 186.

The ported member 206 is prevented from rotation while the shaft 189 is rotated, by means which will appear later and is provided with means whereby rotation of the transfer mold of more than a desired amount is prevented. A diagonally extended portion 210 having a bore in which a ball 210' is placed, is integrally attached to the member 206. This ball is pressed inwardly by a coiled spring 211 also fixed in the bore, while in the periphery of the disk 207 are V-notches 209, one for each side of the transfer drum. These notches are so aligned with the transfer drum that when the ball 210' is forced into a notch 209, a transverse row of transfer molds is presented for approximate registration with the drum molds. However, in a similar manner as was described in reference to the compression mechanism, the combined oscillatory and reciprocatory movements of the transfer mechanism result in a necessity for guiding the mating transfer and drum molds into perfect registry. This is accomplished by the previously mentioned hollow dowel bosses 212 co-acting with the dowels 126 of the molding drum during which time the pressure of the ball 210' in a notch 209 is overridden temporarily, but as soon as the contact of the bosses 212 with the main drum dowels 126 is broken, the ball 210' holds the transfer drum against rotation.

The member 206 is provided with cavities open on the side towards the disk 207. One such cavity is shown at 205, (Figs. 7 and 27) and another at 208 (Fig. 27). The cavity 205 is positioned so as to communicate with the ports 195 and 196 leading from those transfer molds at this time in registry with the drum molds, while the cavity 208 (Fig. 27) is in registry with the ports 195 and 196 leading from the transfer molds on the under side of the transfer drum, or facing downwardly toward the conveyor belt.

Therefore, in order to remove the articles from the drum molds and engage them on the transfer molds, the cavity 205 is evacuated, while at the same time air under pressure is admitted to the under sides of those drum molds that are now in registry, by means now to be described, the description also explaining the method of ejecting the articles retained on the down-turned transfer molds and allowing these articles to drop to the conveyor belt, this operation being accomplished by the use of compressed air.

Removal of the articles by compressed air and suction has been effected in molding machines in the past, the extent of the control, however, usually being only offered by constructions similar to that shown in the present molding drum, that is, by the movement of the ends of ports such as 19 by apertures such as 28. In such movements it will be clear that as the forward edge of the ports meet the edge of an aperture, the air flow, due to either compression or vacuum, does not reach a maximum until the full area of the ports is exposed to the full area of the apertures, and is further affected by slow or rapid rates of movement.

This is good practice insofar as the molding operation is concerned but in the transfer operation, more accurate control of the air flows is needed. This is because best results are secured by a simultaneous loosening of the article from the drum molds by air under pressure and of engaging the article on the transfer mold by suction, to avoid damage by bending the article in any way. Accordingly the air flows are controlled and permitted to occur only when desired and by virtue of a possible nicety of control by the use of the devices to be described, the application of pressure or suction may be delayed until the ports are in complete registry. Moreover, since the actual transfer operation requires only a negligible time lapse, the application may be practically instantaneous. With the present construction, therefore, a valvular function is not required of the edges of ports and apertures but is delegated to devices better fitted for the work under the peculiar conditions as explained.

The manner in which the compressed air-blast and suction are controlled together with the application thereof to the transfer mechanism will now be described, references being made to the several views and especially to Fig. 24, which is a diagrammatic view of the piping connections and like features.

In the view shown in Fig. 7, the transfer molds are seen in registry with the drum molds in readiness to receive the articles. At this time a cam 197 Fig. 1, secured on a shaft 197' receiving motion from the shaft 94 by gears 197'', (Figs. 1, 2 and 8) actuate a valve stem 198 for a valve in a valve box 198' controlling compressed air, allowing a flow of compressed air through a pipe 199, (Figs. 1, 2 and 24), into the cavity 200 in the vacuum box 29. The flow is then through the ports 19 of the drum in registry with an aperture 201 in the plate 27 and thence to the under surfaces of the articles, tending to drive the articles outwardly by this air pressure. At the same time a second cam (not shown) on the shaft 197' acts to open a valve 202 (Figs. 2 and 24) which connects by the pipe 203 and branch 204, having a slidable telescoping arrangement 204' the cavity 205 with the vacuum pumps (not shown) thereby immediately engaging the articles on the transfer molds.

The transfer drum is then moved away from the proximity of the main drum, which as was previously explained is revolving at a uniformly constant speed of rotation. This movement of the transfer drum is the start of the outward portion of its reciprocatory movement and is, of course, accompanied by a downward swing due to the oscillatory movement imparted by means to be described, similar to those employed on the compression mechanism.

Coupled with the start of the inward stroke is the beginning of the partial rotation of the transfer drum. The partial rotation is completed near the upper portion of the oscillatory movement and presents a second row of transfer molds towards the drum molds, and on completion of the cycle these molds register with the drum molds and the articles thereon are transferred as explained before. The partial movement has brought the initial row of transfer molds facing downwardly towards the belt, and shortly after the beginning of the second cycle, the articles retained thereon are released dropping a short distance to the belt.

While the transfer drum is making a partial rotation, the ports 195 and 196 necessarily pass from the proximity of the cavity 205 to that of the cavity 208. Provision is made to prevent the premature release of the articles while the ports 195 and 196 are passing along the space separating the cavities 205 and 208, it being clear that with further movement of the ends of the ports 195 and 196 from the cavity 205, the less the degree of partial vacuum in the ports. On the other hand since the cavity 208 is at times subjected to compressed air, the surface should be sufficiently wide to provide that there should be but little flow or leakage of the compressed air between the mating faces of the members 206 and 207 (Figs. 7 and 27). Accordingly the effective edge of the cavity 205 is positioned as seen at the radial line 222, Fig. 27, and the distance from this line to the adjacent edge of the cavity 208 shows the extent of the surface by which the tendency to short-circuit by leakage is reduced. This comparatively large expanse of surface would tend to reduce the degree of vacuum existing in the ports while the ends thereof are passing along this space, if it were not for the fact that the cavity 208 is also momentarily put into connection with the vacuum lines by the timed opening of the cam-operated valve 223 before the suction is cut off from the cavity 205, so that in this short space of time there is but little change in the degree of vacuum.

The suction in the ports 195 and 196 while in communication with the cavity 208 is maintained until the transfer drum has reached a point in its path of travel suitable for the release, when it is cut off by the closing of the valve 223. Valve 219 is then immediately opened allowing compressed air to force the articles from such transfer molds.

Oscillatory and reciprocatory motion is imparted to the transfer mechanism for the same reasons as given for the similar movements of the compression mechanism and by similar mechanism which, however, are differently positioned in view of the preferable location of the removal point, that is at the side of the drum, or in other words, to provide that the portion 6b—6c of the curve shown in Fig. 20 be produced in an approximately vertical plane. Therefore, the arms 182 and 183 (Fig. 1) oscillate on either side of a substantially horizontal radial, while the hinged arms 228 and 229, duplications of the arms 92 and 93, oscillate on either side of a substantially vertical line.

The hinged arms 228 and 229 are pivotally connected on the ends of a shaft 230 similar to and supported in the same manner as the shaft 94 and driven by a pinion 231 (Fig. 2) meshing with main gear 24. The crank-shaft 232 correspond to the crank-shafts 98 previously described, and an elevation of one is seen in Fig. 7; the crank-throw 233, the intermediate portion 234 and the inner throw 235 are similar to the throws 97, 99 and 100. Each crank-shaft 232 is rotatably mounted in the bore of a boss 183' at a suitable point in one of the arms 182 or 183.

One of the connecting rods 236 by which the throws 235 are connected to the reciprocatory portion of the transfer mechanism is seen in elevation in Fig. 28 and on a larger scale in Fig. 37. The rods have a central turn-buckle member 237 by means of which the center-to-center distance of the rod may be altered to obtain a fine adjustment whereby proper mating of the transfer and drum molds is possible.

The reciprocating end of the rod is placed between a pair of inwardly extending ears 238 and pivotally mounted on a wrist-pin 239 inserted through these ears which are integrally formed with the extended hub 218 of the cross-head 186, (Fig. 7). The pin 239 is also provided with an extended portion 240 which projects into the bore of a boss 241 integrally attached to the ported member 206, and prevents the rotation of this member during the rotation of the transfer drum.

Rotation of the crank shaft 232 from the point shown in Fig. 7 in which figure the transfer molds are in registry with the drum molds, causes the beginning of the reciprocal motion of the transfer mechanism, the cross-head moving in the ways provided in the forked ends of the transfer arms 182 and 183.

In order to prevent vibration in the machine due to the operation of the transfer mechanism, there are provided counter-balancing weights 183ᵃ which are placed on extensions on each of the arms 182 and 183, one of these counter-balancing weights being shown in Fig. 1. These weights act to cause the transfer arms to move down slowly and prevent a jerk in the drive-chains in raising.

An orbital path is followed by the transfer mechanism similar to that described for the compression means, this of course being due to the action of the crank-shafts 232 and the oscillations of the transfer arms 182 and 183. Upon one-half revolution of the crank-shafts 232 the transfer drum is moved to the limit of its movement away from the molding drum, this of course being twice the distance of the throw from the intermediate portion 235 of the crank-shaft. This position is shown in Fig. 37, it being noted that the crank throw 233 is now oppositely positioned as compared to that shown in Fig. 7. In moving to this position the transfer drum remains in the same relative position as regards rotation as when it left the proximity of the drum, the articles being retained in the drum mold by suction caused by the partial vacuum below the transfer molds under the control of the valve 202 Fig. 24. However, in moving to this position, the means by which the transfer drum is given approximately, in the present case, one-quarter turn previously mentioned and which means will now be described, will have assumed other working positions.

Referring again to Fig. 7, the shaft 189 supporting the transfer drum is seen to have an extension 242 on which is mounted at a point adjacent the hub of the cross-head 186, a disk 243 having in its periphery a plurality of notches 244 equal in number to the sides of the transfer drum or to the number of sets of transfer molds employed on the transfer drum. Rotatably mounted upon this shaft extension 242 is a hubbed member 245 having a downwardly and rearwardly depending pawl-carrying arm 246 in which is formed a slotted opening, the inner portion 248 of which is radially disposed with respect to the shaft extension 242 and another portion 248' of which is disposed at an angle thereto forming cam surfaces.

Pivotally mounted on a pin 249 fixed in the arm 241 is a pawl 250 having a hooked end 250' which on engagement fits into one of the notches 244 in the disk 243, this pawl being normally held in engaging relation with the disk 243 by the action of a coil spring 251 (Fig. 31).

On the lower side of the pawl at an intermediate point between the pivot pin 249 and the hooked end 251' is a pair of downwardly depending ears 253 (Figs. 34 and 35) between which is positioned a throw-out trigger 254 loosely mounted on a pin 255. This trigger 254 has an extended portion 257 adapted to bear against the lower side of the pawl 250 and is retained in that position by the action of a spring 258 (Fig. 35). This construction allows the trigger to swing in a direction in which the spring 258 is further coiled but on moving in the opposite direction the movement is limited by contact of the portion 257 with the pawl portions 248 and 248'.

Acting within the slot is a roller 259 rotatably mounted upon an eccentric pin 260 supported in an eccentric bushing 261 (Fig. 33) which in turn is supported by a bracket 262 secured to the outer sides of the lower jaw 185 of the transfer arm. The roller being stationarily supported with respect to the movement of the cross-head will cause a movement of the pawl arm 246 on contact of the roller 259 with the portion 248 of the slot in one direction of the stroke of the crosshead, and will then act to cause the parts to assume the original position on the return stroke thereof. In Fig. 36 wherein the transfer mechanism is shown as having made only a portion of the outward stroke, the lower end 263 of the trigger 254 makes contact with the roller 259 to cause the pawl 250 to be lifted sufficiently to be disengaged from the notch 244 of the disk 243. During this movement the transfer drum is held against rotation by the pressure of the ball 210' in one of the notches 209. Further movement outwardly of the transfer drum causes a downward swing of the arm 246 by contact of the radial portion 248 of the slot with the roller 259 and at the end of the downward stroke an arrangement of the ports such as is seen in Fig. 37 occurs in which is seen that end 263 of the trigger 254 has slipped over the roller 259, and since the spring 251 is of greater power than the spring 258, the hooked end 250' of the pawl 250 is re-engaged in the next succeeding notch of the disk 243. Accurate timing of the contact of the roller 246 with the cam surfaces of the slot 236 is obtained by proper adjustment of the eccentric pin 260 and eccentric bushing 261.

The return stroke of the transfer mechanism starts from the position as seen in Fig. 37 and in Fig. 38 the effect of a portion of the return stroke is shown. The pawl 250 has engaged a notch displaced 90° from the notch in which it was shown engaged in Fig. 31 and since the direction of movement of the cross-head is to the left at this time, the contact of the roller 259 with the side of the radial portion 248 of the slot causes a swing of the arm 246 and through the medium of the pawl 250, the transfer drum is given a partial rotation in the direction of the arrow 264 (Fig. 38). The angular position of the drum 190 shown in Fig. 38 is a result of this partial rotation and the transfer molds indicated at 7ª are those molds which were in the position as shown in Fig. 7 before the partial rotation was begun.

The different positions assumed by the transfer drum are shown diagrammatically in Figs. 39 to 44 inclusive. In Fig. 39 the molded article indicated at A is shown being transferred to one of the molds on the transfer drum. Fig. 40 shows the position of the transfer drum after it has been partially moved away from the forming drum. Fig. 41 shows the position of the transfer drum at the outer end of its reciprocatory movement and at the start of its rotary motion. Fig. 42 shows the position of the transfer drum after the intermittent rotary movement has been completed and the drum has started upon its movement toward the forming drum. Fig. 43 shows the transfer drum again in the position shown in Fig. 39 and in the act of receiving another molded article B. Fig. 44 shows the position of a transfer drum again in the position of Fig. 40 and in the act of discharging onto the endless conveyor 181 the molded article A.

Having thus described my invention I claim:

1. In a molding machine, a continuously rotating molding member having a series of circumferentially extending forming molds, a single mating mold member to cooperate with said forming molds, and means for bringing said mating mold member successively in cooperative relation with each forming mold, said means including mechanism to move the mating mold member to and from the forming molds and positive means to cause the mating mold to travel therewith for a limited distance and restore same to initial position.

2. In a molding machine, a continuously rotating molding member having a series of circumferentially extending forming molds, a support for a single mating mold member, a mating mold member mounted on said support to cooperate with said forming molds, and means for bringing said mating mold member successively in cooperative relation with each forming mold, said means including mechanism to move said supporting member to and from said molding member and mechanism to cause said supporting member to travel with said molding member for a limited distance and restore same to a position to coact with the next succeeding forming mold.

3. In a molding machine, a continuously rotating molding member having a series of circumferentially extending forming molds, a supporting member for a single compression member, a compression member yieldably mounted on said supporting member to permit said compression member to yield toward said support member and also laterally with respect thereto, and means for bringing said compression member successively in cooperative relation with each forming mold, said means including mechanism to move the supporting member to and from the molding member and also means to cause the supporting member to travel with said molding member for a limited distance and restore same to initial position.

4. In a molding machine, a continuously rotating molding member having a series of circumferentially extending forming molds, an oscillatory member arranged to oscillate about said molding member, a mating mold mounted to reciprocate in said oscillatory member, and be oscillated thereby, and means for oscillating said oscillatory member and reciprocating said mating mold with relation thereto to bring said mating mold successively in cooperative relation with said forming molds and cause the same to travel for a limited distance therewith.

5. In a molding machine, a continuously rotating molding member having a series of circumferentially extending forming molds, an oscillatory member arranged to oscillate about said molding member, a supporting member mounted to reciprocate in said oscillatory member, and be oscillated thereby, a mating mold carried by said supporting member, and means for oscillating said oscillatory member and reciprocating said supporting member to bring said mating mold successively in cooperative relation with said forming molds and cause the same to travel for a limited distance therewith.

6. In a molding machine, a continuously rotating molding member having a series of circumferentially extending forming molds, an oscillatory member arranged to oscillate about said rotary molding member, a supporting member mounted to reciprocate in said oscillatory member and be oscillated thereby, a compression mold carried by said supporting member, means to permit said compression mold to yield towards said supporting member and sidewise in relation thereto, and means for oscillating said oscillatory member and reciprocating said supporting member to bring said compression mold successively in cooperative relation with said forming molds and cause the same to travel for a limited distance therewith.

7. In a molding machine, a continuously rotating molding member having a series of circumferentially extending forming molds, a single compression mold member to cooperate with said forming molds rotatable upon its own axis, means for bringing said compression mold member successively in cooperative relation with each forming mold and to cause the same to travel therewith for a limited distance, and means for rotating said compression mold.

8. In a molding machine, a continuously rotating molding member having a series of circumferentially extending forming molds, a support for a single compression mold member, a compression mold member rotatably mounted in said support to cooperate with said forming molds, means for moving said support to and from said molding member and for causing the same to travel with the molding member for a limited distance, and means for rotating said compression member.

9. In a molding machine, a continuously rotating molding member having a series of circumferentially extending forming molds, an oscillatory member arranged to oscillate about said molding member, a supporting member mounted to reciprocate in said oscillatory member and to be oscillated thereby, a compression mold rotatably carried by said supporting member, means for oscillating said oscillatory member and reciprocating said supporting member to bring said compression mold successively in cooperative relation with said forming molds and causing same to travel for a limited distance therewith, said means including devices for rotating said compression mold.

10. In a molding machine, a continuously rotating molding member having a series of circumferentially extending forming molds, an oscillatory member arranged to be oscillated about said molding member, a supporting member including a shaft mounted to reciprocate in said oscillatory member and to be oscillated thereby, a rotatable compression mold carried by said supporting member cooperatively connected with said shaft, and devices for oscillating said oscillatory member, reciprocating said supporting member to bring said compression mold successively in cooperative relation with said forming molds, and rotating said shaft.

11. In a molding machine, a continuously rotating molding member having a series of circumferentially extending forming molds, an oscillatory member arranged to be oscillated about said molding member, a supporting member including a shaft mounted to reciprocate in said oscillatory member and to be oscillated thereby, a rotatable compression mold carried by said supporting member operatively connected with said shaft, devices for oscillating said oscillatory member, reciprocating said supporting member to bring said compression molds successively in cooperative relation with said forming molds, and rotating said shaft, and means for disengaging said rotary compression mold from said shaft.

12. In a molding machine, a continuously rotating molding member having a series of circumferentially extending forming molds, a supporting member for a compression mold, a compression mold yieldably mounted on said supporting member to permit said compression mold to yield laterally with respect thereto, means for bringing said compression mold successively in cooperative relation with each forming mold, including mechanism to move the supporting member to and from the molding member and also means to cause the supporting member to travel with said molding member for a limited distance, and dowel pins and cooperating sockets therefor carried respectively by the molding drum and compression mold support to insure proper registration between the respective mating molds.

13. In a molding machine, a continuously rotating molding member having a series of circumferentially extending forming molds, an oscillatory member arranged to oscillate about said molding member, a supporting member mounted to reciprocate in said oscillatory member and to be oscillated thereby, a mating mold carried by said supporting member, a crank-shaft carried by said oscillatory member having a pair of crank-pins, a connection between one of said crank-pins and said supporting member, and pivotally mounted means connected with the other pin of said crank-shaft for rotating said shaft to thereby impart oscillatory movement to said oscillatory member and reciprocatory movement to said supporting member to bring said mating mold successively in cooperative relation with said forming molds.

14. In a molding machine, a continuously rotating molding member having a series of circumferentially extendng forming molds, an oscillatory member arranged to oscillate about said molding member, a supporting member arranged to reciprocate in said oscillatory member and to be oscillated thereby, a mating mold carried by said supporting member, a crank-shaft having a crank-pin upon each end thereof, means including a pitman rod for connecting one of said crank-pins with said supporting member, a pivoted member in the free end to which the other crank-pin is journaled, and mechanism carried by said pivoted member operatively connected with said last mentioned crank-pin for rotating said crank-shaft.

15. In a molding machine, a continuously rotating molding member having a series of circumferentially extending forming molds, an oscillatory member arranged to oscillate about said molding member, a supporting member mounted to reciprocate in said oscillatory member and be oscillated therewith, a shaft journaled in said oscillatory member, a rotary compression mold carried by said supporting member, means for connecting said compression mold with said shaft to impart rotary movement thereto, a crank-shaft journaled in said oscillatory member having a crank-pin on each end thereof, a pitman rod pivotally connecting the inner crank-pin with said mold operating shaft, driving devices carried by said pitman for rotating said mold operating shaft, a pivoted member in the free end of which the other end of said crank-shaft is journaled, and driving devices carried by said pivoted member and connected to said last mentioned crank-pin for rotating said crank-shaft whereby oscillatory movement is imparted to said oscillatory member, reciprocating movement to said compression mold supporting member, and rotation to said operating shaft.

16. In a molding machine, a continuously rotating molding member having a series of circumferentially extending forming molds, a yoke-shaped oscillatory member having side arms pivoted at the axis of said molding member, a mating mold support slidably mounted in the arms of said oscillatory member, a mating mold carried by said support, a crank-shaft journaled in a side arm of said oscillatory member having a crank-pin on each end thereof, said crank-pin being substantially diametrically opposite each other, a pivoted member in the free end of which the outer crank-pin is journaled, gearing and connections carried by said pivoted member and operatively connected with said outer crank-pin to rotate said crank-shaft, and connections including a pitman rod for connecting the inner crank-pin with said mating mold supporting member.

17. In a molding machine, a continuously rotating molding member having a series of circumferentially extending forming molds, an oscillatory member arranged to oscillate about said molding member, a supporting member mounted to reciprocate in said oscillating member and to be oscillated therewith, a mating mold carried by said supporting member, a crank-shaft journaled in said oscillatory member and having a crank-pin on each end thereof, means for connecting the inner crank pin with said reciprocatory supporting member, a pivoted member in the free end of which the outer crank-pin is journaled, means carried by said pivoted member and connected with said crank-shaft for rotating the same whereby oscillatory movements will be imparted to said oscillatory member and also to said pivoted member and a reciprocating movement imparted to said supporting member, said pivoted member being so disposed with respect to said oscillating member that the centers of oscillations of the pivoted member and oscillatory member will be substantially at right angles to each other.

18. In a molding machine, a continuously rotating molding member having a series of circumferentially extending forming molds, an oscillatory member arranged to oscillate said molding member, a supporting member mounted to reciprocate in said oscillatory member and to be oscillated thereby, a mating mold carried by said supporting member, a crank-shaft carried by said oscillatory member having a crank-pin on each end thereof, means for connecting the inner crank-pin with said reciprocatory member, a pivoted member in the free end of which the outer crank-pin is journaled, means carried by said pivoted member for driving said crank-shaft including a pair of aligned shafts, and adjustable means connecting the adjacent ends of said shafts whereby one shaft may be given a slight rotation independent of the other shaft for timing purposes.

19. In a molding machine, a continuously rotating molding member having a series of circumferentially extending forming molds, means for rotating said molding member including a large gear connected with said molding member, an operating shaft driven by said large gear, an oscillatory member arranged to oscillate about the axis of said molding member, a supporting member mounted to reciprocate in said oscillatory member and to be oscillated thereby, a mating mold rotatably carried by said supporting member, a crank-shaft journaled in said oscillatory member having a crank-pin on each end thereof, means for connecting the inner crank-pin with said reciprocatory supporting member, a pivoted member pivoted about the axis of said operating shaft and in the free end of which the outer crank-pin is journaled, and gearing and connections extending from said operating shaft to said last mentioned crank-pin and carried by said pivoted member for rotating said crankshaft.

20. In a molding machine, a continuously rotating molding member having a series of circumferentially extending forming molds, a compression member cooperating with said molding member, a transfer mold to cooperate with said forming molds, means for bringing said transfer mold into cooperative relation with said forming mold, said means including mechanism to move the transfer mold to and from the forming mold and causing the same to travel therewith for a limited distance, and means for moving said transfer mold to a point of discharge and restoring the same to a position where it may again be brought into cooperative relation with said forming molds.

21. In a molding machine, a continuously rotating molding member having a series of circumferentially extending forming molds, a compression member cooperating with said molding member, a support for a transfer mold, a transfer mold mounted on said support to cooperate directly with said forming molds, means for bringing said transfer molds into cooperative relation with said forming molds, said means including mechanism to move said supporting member to and from said molding member and causing said supporting member to travel with said molding member for a limited distance, and means for moving said support to a point of discharge for said transfer molds and again restoring the same to a position where it may be again brought into cooperative relation with said molding member.

22. In a molding machine, a continuously rotating molding member having a series of circumferentially extending forming molds, a compression member cooperating with said molding member, a support for a transfer mold, a transfer mold mounted on said support to cooperate with said forming molds, means for bringing said transfer mold into direct cooperative relation with said forming molds, said means including mechanism to move said supporting member to and from said molding member and causing said supporting member to travel with said molding member for a limited distance, said support being movably mounted upon its axis, and means for rotating said support upon its axis to a point of discharge for said transfer mold and again restoring same by an additional movement about its axis to a position where said transfer mold may be brought into cooperative relation with said molding member.

23. In a molding machine, a continuously rotatable molding member having a series of circumferentially extending forming molds, a rotatable support for transfer molds, a series of transfer molds circumferentially mounted on said support to cooperate with said forming molds, means for moving said support to and from said forming molds and for causing the same to travel with said molding member for a limited distance, and means for imparting an intermittent rotary movement to said support.

24. In a molding machine, a continuously rotatable molding member having a series of circumferentially extending forming molds, a rotatable support for transfer molds, a series of transfer molds circumferentially mounted on said support to cooperate with said forming molds, means for moving said support to and from said forming molds and for causing the same to travel with said molding member for limited distance, and means for imparting an intermittent rotary movement to said support, said means including a pivoted pawl and a ratchet wheel carried by said support and devices for engaging and disengaging said pawl and ratchet wheel.

25. In a molding machine, a continuously rotatable molding member having a series of circumferentially extending forming molds, a rotatable support for transfer molds, a series of transfer molds circumferentially mounted on said support to cooperate with said forming molds, means for moving said support to and from said forming molds and for causing the same to travel with said molding member for a limited distance, and means for imparting an intermittent rotary movement to said support, said means including a pivoted pawl and a ratchet wheel carried by said support and devices for engaging and disengaging said pawl and ratchet wheel, said latter devices being operable to engage said pawl with the ratchet wheel when said support is moved toward said molding member.

26. In a molding machine, a continuously rotating molding member having a series of circumferentially extending forming molds, an oscillatory member arranged to oscillate about said molding member, a transfer mold mounted to reciprocate in said oscillatory member and to be oscillated thereby, means for oscillating said oscillatory member and reciprocating said transfer member with relation thereto to bring said transfer mold into cooperative relation with said forming molds and cause the same to travel for a limited distance therewith, and means for imparting an additional movement to said transfer mold to bring it to a discharge point again restoring same to a position where it may be brought into cooperative relation with said molding member.

27. In a molding machine, a continuously rotating molding member having a series of circumferentially extending forming molds, an oscillatory member arranged to oscillate about said molding member, a supporting member mounted to reciprocate in said oscillatory member, a transfer mold carried by said supporting member, means for oscillating said oscillatory member and reciprocating said supporting member to bring said transfer mold into cooperative relation with said forming molds and cause the same to travel for a limited distance therewith, and means for imparting an additional movement to said support to position the transfer mold at a point of discharge and again restore said support to a position where said transfer mold may be brought into cooperative relation with said molding member.

28. In a molding machine, a continuously rotating molding member having a series of circumferentially extending forming molds, an oscillatory member mounted to oscillate about said molding member, a rotary supporting member mounted to reciprocate in said oscillatory member, a plurality of transfer molds extending circumferentially about said supporting member, means for oscillating said oscillatory member and reciprocating said supporting member to bring said transfer molds into cooperative relation with said forming molds and cause the same to travel for a limited distance therewith, and means for imparting an intermittent rotary movement to the said rotary supporting member.

29. In a molding machine, a continuously rotating molding member having a series of circumferentially extending forming molds, a rotary supporting member mounted to reciprocate in said oscillating member, a plurality of transfer molds extending circumferentially about said supporting member, means for oscillating said oscillatory member and reciprocating said supporting member to bring said transfer molds into cooperative relation with said forming molds and cause the same to travel for a limited distance therewith, the ratchet wheel connected with said supporting member, a pivoted pawl arm mounted on said supporting member, a pivoted spring-pressed pawl on said arm cooperating with said ratchet wheel, and means on said oscillatory member for swinging said arm and imparting a rotary motion to said support.

30. In a molding machine, a continuously rotating molding member having a series of circumferentially extending forming molds, a rotary supporting member mounted to reciprocate in said oscillating member, a plurality of transfer molds extending circumferentially about said supporting member, means for oscillating said oscillatory member and reciprocating said supporting member to bring said transfer molds into cooperative relation with said forming molds and cause the same to travel for a limited distance therewith, a ratchet wheel connected with said supporting member, a pivoted pawl arm mounted on said supporting member, a pivoted spring-pressed pawl on said arm cooperating with said ratchet wheel, and means on said oscillatory member for swinging said arm and imparting rotary motion to said support, and means for disengaging said pawl from said ratchet wheel at a predetermined point.

31. In a molding machine, a continuously rotating molding member having a series of circumferentially extending forming molds, a rotary supporting member mounted to reciprocate in said oscillatory member, a plurality of transfer molds extending circumferentially about said supporting member, means for oscillating said oscillatory member and reciprocating said supporting member to bring said transfer molds into cooperative relation with said forming molds and cause the same to travel for a limited distance therewith, and a ratchet wheel connected to said rotary support, a pawl arm pivotally mounted thereon having an angular slot, a pivoted spring-pressed pawl on said arm cooperating with said ratchet wheel, a pivoted trigger connecting with said arm, and a member on said oscillatory member extending into said slot for swinging said arm and engageable with said trigger to disengage said pawl.

32. In a molding machine, a continuously rotating molding member having a series of circumferentially extending forming molds, a compression member cooperating with said molding member, a support for a transfer mold, a transfer mold mounted on said support to cooperate with said forming molds, means for moving said support to bring said transfer mold into direct cooperative relation with said forming molds, means for producing an air pressure beneath each forming mold at the point of engagement with said transfer mold, means for producing an air suction beneath said transfer mold at such point, means for moving said support to bring the transfer mold to a point of discharge, means for producing an air pressure beneath said transfer mold at such latter point, and means for maintaining a partial vacuum beneath said transfer mold during its movement to discharging position.

In testimony whereof, I have hereunto set my hand this 4th day of November, 1931.

WILLIAM J. DE REAMER.